United States Patent [19]

Eickmann

[11] Patent Number: 4,496,120
[45] Date of Patent: Jan. 29, 1985

[54] ARRANGEMENTS OF OR TO PROPELLERS TO IMPROVE THE CAPABILITIES OF PROPELLER-DRIVEN CRAFT

[76] Inventor: Karl Eickmann, 2420 Isshiki, Hayama-machi, Kanagawa-ken, Japan

[21] Appl. No.: 330,980

[22] Filed: Dec. 15, 1981

Related U.S. Application Data

[60] Continuation-in-part of Ser. No. 110,157, Jan. 7, 1980, which is a continuation-in-part of Ser. No. 895,687, Apr. 12, 1978, abandoned, which is a continuation-in-part of Ser. No. 760,006, Jan. 17, 1977, Pat. No. 4,136,845, which is a continuation-in-part of Ser. No. 104,676, Mar. 8, 1971, Pat. No. 3,823,898, said Ser. No. 330,980, is a division of Ser. No. 954,555, Oct. 25, 1978, Pat. No. 4,358,073, and Ser. No. 973,780, Dec. 27, 1978, which is a continuation-in-part of Ser. No. 760,006, Jan. 17, 1977, Pat. No. 4,136,845.

[51] Int. Cl.$^3$ .............................................. B64D 27/00
[52] U.S. Cl. ................................. 244/56; 244/12.1; 244/105
[58] Field of Search ................ 244/12, 7, 6, 105, 52, 244/53, 54, 55, 56, 65, 66, 123, 60

[56] References Cited

U.S. PATENT DOCUMENTS

| | | | |
|---|---|---|---|
| 1,398,353 | 11/1921 | Wickelmann | 244/65 |
| 2,360,433 | 10/1944 | Magruder | 244/123 |
| 2,514,639 | 7/1950 | Haack | 244/56 |
| 2,988,152 | 6/1961 | Katzenberger et al. | 244/123 |
| 3,211,399 | 10/1965 | Eickmann | 244/60 |
| 3,289,980 | 12/1966 | Hill | 244/56 |
| 4,093,155 | 6/1978 | Kincaid, Jr. | 244/56 |

FOREIGN PATENT DOCUMENTS 767746  7/1934  France .................................. 244/56

Primary Examiner—Galen L. Barefoot

[57] ABSTRACT

Propellers are provided to drive a vehicle or to bear a vehicle in air. Such propellers have commonly been fixed to wings or fuselages. The fixed locations of the propellers limited the abilities and capabilities of the respective vehicle. The invention now provides arrangements on or to propellers which makes it possible to change the location of the respective propeller relatively to another portion of the vehicle. The change of the location of the propeller in relation to another portion of the vehicle makes it possible to improve the abilities or capabilities of the vehicle. Specifically beneficial effects are obtained by applying the invention to propeller-pairs. Specific relations of locations of propellers to wings or to flow of air in combination with means to pivot portions of the arrangement(s) can lead to better overall efficiencies, speeds, bearing capacities, economy or comfort of the vehicle or of portions thereof.

5 Claims, 22 Drawing Figures

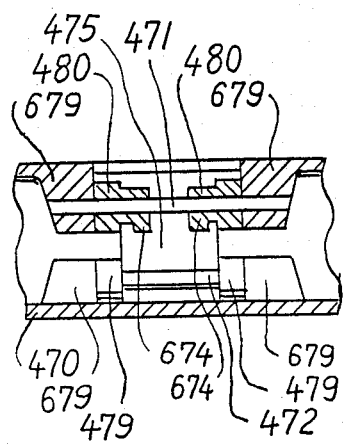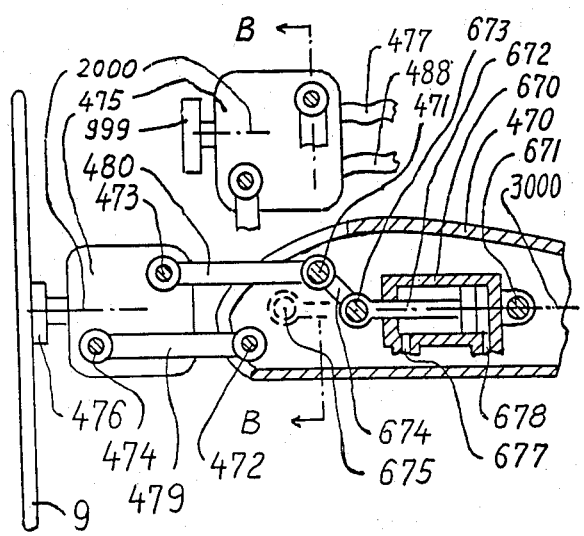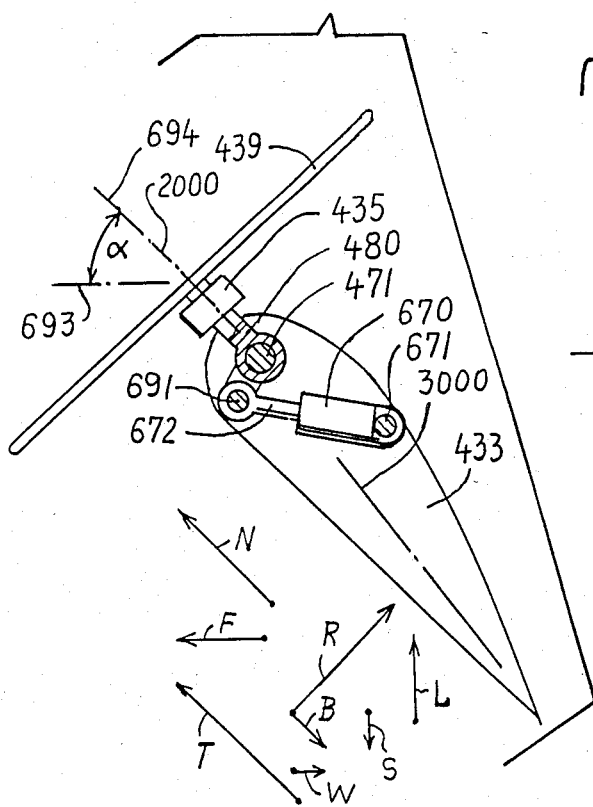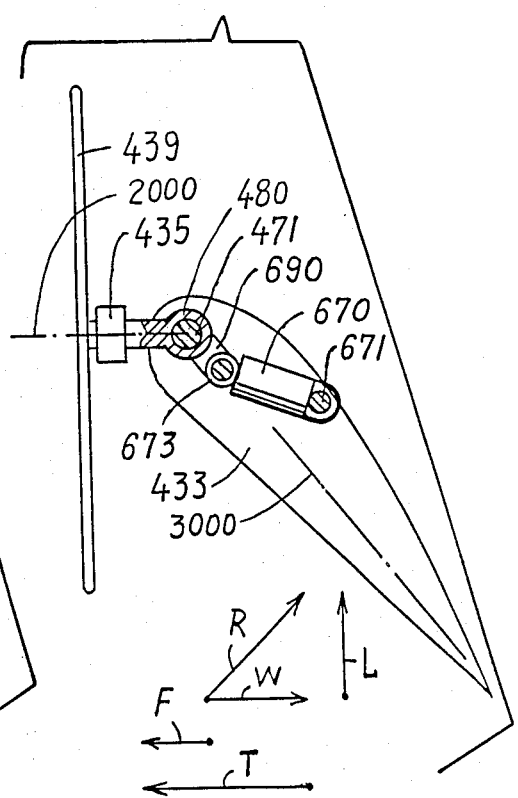

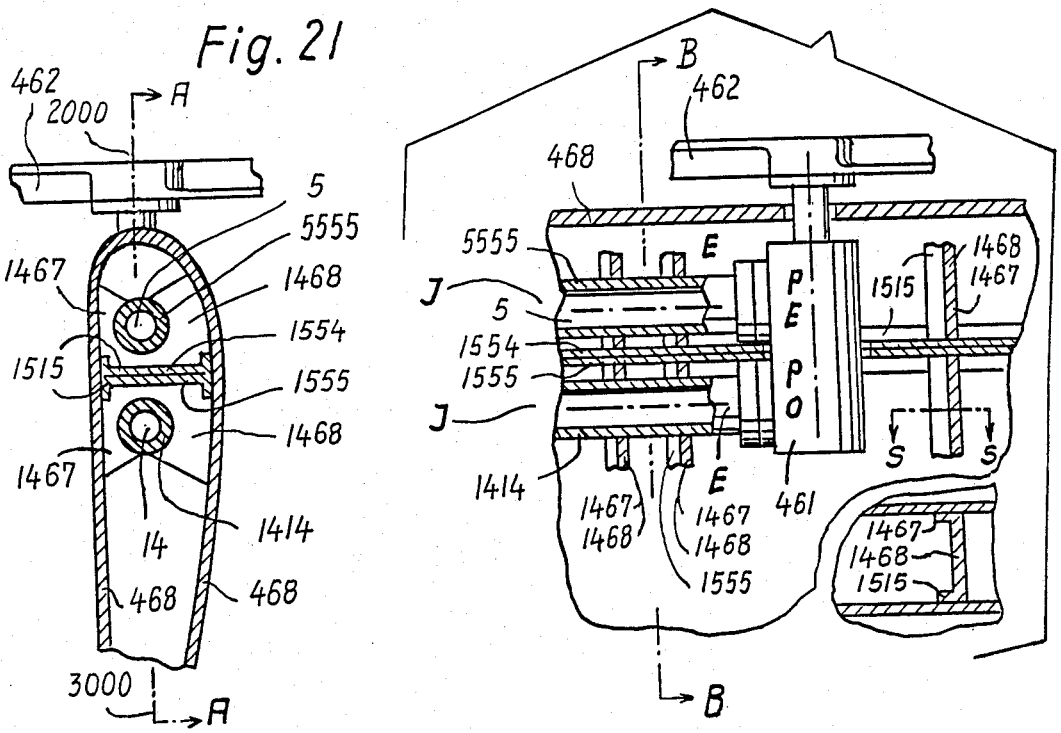
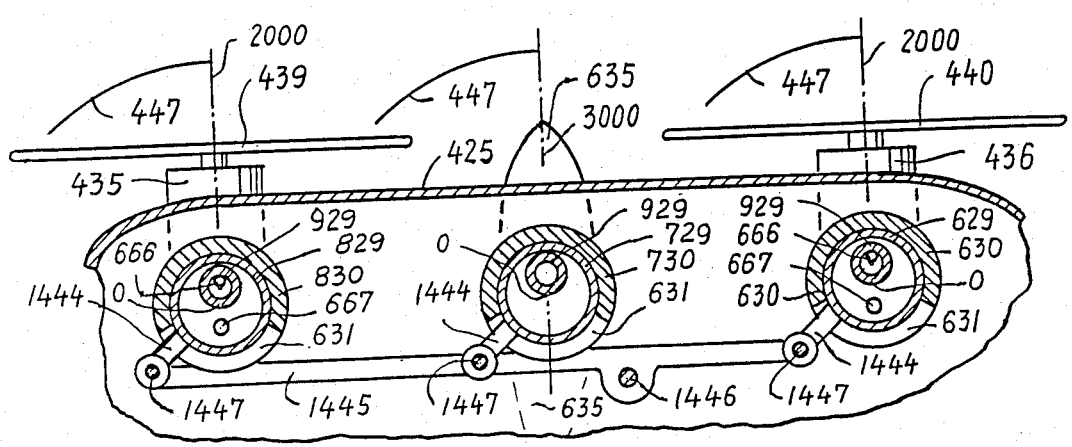

ARRANGEMENTS OF OR TO PROPELLERS TO IMPROVE THE CAPABILITIES OF PROPELLER-DRIVEN CRAFT

REFERENCE TO RELATED APPLICATIONS

This is a continuation in part application of my co-pending patent application, Ser. No. 110,157, which was filed on Jan. 7th, 1980 as a continuation in part application of the that time co-pending application, Ser. No. 895,687, filed on Apr. 12, 1978, which is now abandoned.

Application Ser. No. 895,687 was a continuation in part application of my earlier application, Ser. No. 760,006, filed on Jan. 17th, 1977. Application Ser. No. 760,006 is now U.S. Pat. No. 4,136,845 and issued on Jan. 30th, 1979.

Application Ser. No. 760,006 was a continuation in part application of my still earlier application Ser. No. 104,676, filed on Mar. 8th, 1971, now U.S. Pat. No. 3,823,898.

Application Ser. No. 104,676 itself arrived from earlier applications, which are mentioned in now granted U.S. Pat. No. 3,823,898. The eldest application therein is application Ser. No. 328,395 of Dec. 5th, 1963, now U.S. Pat. No. 3,220,898. Another important application therein is application Ser. No. 551,023 of May 18th, 1966, now abandoned. Priority for the equalness of rates of flow in flows to hydraulic motors which drive propellers is thereby substantiated by application Ser. No. 328,395 of Dec. 5th, 1963 and the priority for the use of such drive to propeller vehicles forward and maintain their straight forward path by equally driven propeller pairs wich one propeller of each pair on another side of the vehicle is obtained by application Ser. No. 551,023 of May 18th, 1966.

This present patent application is also a divisional application, at the filing date of the present application, of my patent applications, Ser. No. 954,555 which was filed on Oct. 25th, 1978 and of the co-pending patent application, Ser. No. 973,780, which was filed on Dec. 27th, 1978 as a continuation in part application of Ser. No. 760,006, now U.S. Pat. No. 4,136,854.

Application Ser. No. 954,555 is now U.S. Pat. No. 4,358,073 which issued on Nov. 12, 1982.

BACKGROUND OF THE INVENTION

A propeller consumes a certain power at stand of the vehicle, when the vehicle is not moving and it consumes another power for the creation of thrust, when the vehicle moves forward, whereby the propeller moves forward relatively to the air of the atmosphere or to the water wherein or on the vehicle moves.

The power consumed by the propeller varifies with the speed of the vehicle for any amount of desired thrust.

It was custom heretofore to use variable pitch propellers to obtain the best propeller efficiency at different speeds of the vehicle.

It was also proposed in the past to use propeller pairs of different numbers of propeller blades to drive ships by multiple propeller pairs. At those drives of ships it was also already proposed to use different pitches of the propellers to obtain a running of the ship with a minimum of vibration.

However, it was never tried to use a plurality of propeller-pairs with equal pitches of the propellers of the same pair but different pitches of the propellers of another pair and to varify automatically the power supply to the different propeller pairs in order to supply to each propeller pair the different powers for different speeds.

It however, such power division would become possible, the vehicle could be driven by propeller pairs of simple propellers with fixed-pitch, inexpensive propellers, but different pitches in different propeller pairs. And, such vehicle would then be able to run with good efficiencies at different forward speeds.

While my co-pending application serial number deals extensively with such power division, the present invention will deal with the change of propeller(s) relatively to other parts of a vehicle or relative to air or surrounding conditions. It is intended by this invention to use such changes or varification(s) of at least one propeller in order to improve or extend the capability-(ies) of a craft.

SUMMARY OF THE INVENTION

When a propeller rests relatively to the fluid, like water or air, wherein it is applied, it consumes the power:

$$N=\sqrt{S^3/2\rho F} \qquad (1)$$

But, when the propeller moves forward relatively to the fluid, it consumes the power:

$$N=0.5\rho C_w A V_o^3 \qquad (2).$$

In the above equations the following values are applying:

N=power f.e. in Kgm/s
S=thrust in KG.
$\rho$=density of fluid; f.e. 0.125 Kgs$^2$/m$^4$ for air;
F=Area of propeller circle=$d^2\pi/4$ f.e. in m$^2$ with d=diameter of the propeller; for example, in m.
A=Vertical projection of the propeller-blade f.e. in m$^2$.
Vo=relative velocity of this rotary speed of the propeller-blade relatively to the fluid, for as example in m/s.
Cw=drag coefficient of the propeller-blade.
Vo=is $2R\pi(n/60)$ in m/s for R=radius of prop in m for the respective propeller area and n=RPM.

The above equations are prooven in my-copending patent application Ser. No. 973,780 of 12-27-78, which is now abandoned and; and in my german patent publication 2,903,389 of Oct. 10th, 1979.

In said publications the development of the above equations can become studied.

Equation (2) is given in the said patent application and publication for an aircraft, or an aircraft wing. The propeller-blade is acting in the same way as an aircraft wing, when not seen in the direction of movement of the propeller's axis but seen in the direction of movement of the propeller blade relatively to the surrounding fluid. Equation (2) can therefore be applied to a propeller-blade as well as to an aircraft wing. The power consumption of the propeller is then obtained by calculating and summarizing all consumed powers of all blade portions.

In equation (2) appears the drag-coefficient Cw. This coefficient depends strongly on the angle of attack of the propeller and the angle of attack is a function of the pitch of the propeller and of the forward speed of the vehicle, because with increasing forward speed of the vehicle the angle of attack decreases, when the propeller has a fixed, constant pitch.

The value of the drag coefficient Cw is commonly around 0.04 at angle of attack about zero and it rises to about 0.2 at angle of attack about 15 degrees.

The applicant now considers, that the vehicle should be driven by a single power plant and said plant should drive at least two propeller pairs. Then the fact exists, that only the installed power is available for the vehicle and it can not be rised over the installed power.

The vehicle intends to fly economically at a higher forward speed, or to move at a higher forward speed. At such high forward speed the propeller pair requires a suitable angle of attack in order to obtain the best traction or thrust at the respective forward speed. The propellers to drive the vehicle at such forward speed therefore require a high pitch of the fixed propeller's constant pitch, because the forward speed requires such high angle of pitch in order to obtain the suitable angle of attack at the mentioned forward speed.

When the same propeller would be used with the so installed propeller pitch to run the vehicle with slow speed, the active angle of attack would become so high, that the power required would be so high, that the installed power would not be able any more to revolve the propeller. Because the propeller pitch for high forward speed would then give an angle of attack, probably even higher than the mentioned 15 degrees and the drag coefficient would become so high, that the engine would fail to supply enough power to revolve the propeller with enough rotary speed.

To run the vehicle effectively at start or at low speed it would, therefore be required to give the propeller pair a smaller angle of attack in order, that the engine or power plant has enough power to spin the propellers around with enough rotary velocity.

But, when the propellers would get such a small pitch to be suitable for running the vehicle at low speed, the propellers would have too small an angle of attack at the higher forward speed, that they would not bite then any more and the craft or vehicle would then not be able any more to obtain such a high speed as the installed power could give the vehicle when it would have propellers with suitable angle of attack at the higher forward speed.

The consideration solves these problems thereby, that it drives at least two propeller pairs by a transmission means between the power plant and the propellers. Hereto it adds, that the propellers of one of the pairs have another pitch than the propellers of the other propeller pair. For example, one propeller pair for a slower forward speed and the other propeller pair for a higher forward speed of the vehicle. To held the vehicle simple and inexpensive in production, the invention applies in addition a fixed ratio of transmission speed between the power plant and the propellers. Thereby the propellers of equal pairs revolve with equal rotary velocities. The rotary direction may be opposite, when the propellers of the pair are arranged on opposite sides of the vehicle.

By this solution the novel and highly desireable effect appears, that at the lower speed one of the propeller pairs effectively bites and accelerates the vehicle forward to enter the higher speed range as quick as possible. True, the propellers of the higher-speed pair have now too high an angle of attack and they are braking the speed of the propellers or they are restricting the revolutions of them. But as soon as the higher speed range is obtained, the propellers of the higher speed range pair will bite effectively, while the propellers of the lower speed pair are now having a very small or negative angle of attack and therefore now, in the higher speed range consume only little power.

The novel and highly effective solution of the consideration now is, that gradually with increase of the forward speed of the vehicle, more and more of the power goes to the higher speed range propeller pair. Or, in other words, during the acceleration procedure of the vehicle the portions of power supplied to the propeller pairs change or vary relatively to each other. The power portion transfered to the higher speed range propeller pair increases with increase of forward speed of the vehicle relatively to the power portion supplied to the lower speed propeller pair.

Thus, the power available is stepplessly variable between the propeller pairs depending on the forward motion speed of the vehicle. The power is automatically and without any pilot-action or driver-action more and more supplied to the higher speed propeller pair, when the speed of the vehicle increases.

The total installation of power to the vehicle is thereby less than would be required, when the vehicle would run with propellers with equal pitch only, or when each propeller would have an individual power plant.

Due to another object the transmission is a multi flow fluid drive of individual flows which enforces equal rotary velocities in equal propeller pairs.

Another object is, to make at least one pair of flows of the fluid drives variable by application of a variable multiple flow pump in order to be able to selectively influence the power portion to be transferred to the respective propeller pair.

It is also possible to apply plural variable multi-flow pump sets in order to operate different propeller pairs at different forward speeds of the vehicle, whereby most economic propeller efficiencies of different propeller pairs can be obtained at both speed ranges, the lower and the higher forward speed range. Thereby almost all available power can be transferred to the lower speed propeller pair at lower forward speed of the vehicle, while almost all of the available power can be transferred to the higher speed range propeller pair at the higher forward speed of the vehicle and in speed ranges therebetween the power can be delivered in the right proportion to one or the other or both of the installed propeller pairs.

With the above described technological background, it is now possible to engage the specific objects of the present invention.

The main object of the invention is, to provide an arrangement to at least one propeller with means to varify at least one portion in relation between a propeller and its neighborhood in order to obtain a specific capability.

Other objects of the invention are for example, definable as follows:

(b) The arrangement of (a) including a body provided with means to permit a bearing of said body by a fluid wherein a propeller is fastened to said body, and, wherein said arrangement is a pivot bearing, which at least indirectly permits a pivotion of said propeller.

(c) The arrangement of (a) including a body which is provided with means to permit a swing on an embodiment while said embodiment includes a propeller.

wherein said swing permits a dislocation of the axis of said propeller, and, wherein said dislocation of said axis appears at substantially maintaining parallelity of locations of said axis.

(d) The arrangement of (a), wherein a propeller is pivotably fastened to an airfoiled section of a body by a pivot bearing assembly, wherein said pivot bearing assembly includes means to pivot a fluid motor in unison with a propeller wherein said pivot bearing includes means to transfer fluid from a power supply source to said motor, wherein a fluid stream is forced over said section, when said propeller revolves, and, whereby said fluid stream created by said propeller actuates and maintaines a component of lift on said section.

(e) The arrangement of (a), wherein said arrangement provides a propeller which is driven by a fluid motor, and, wherein said fluid motor and said propeller are swung vertically up and down along a body portion in order to temporary let said propeller work effectively in air at flight and to let said propeller be swung up at other times in order to prevent a meeting of said propeller with water, when said arrangement rides or rests on or above the surface of a water.

(f) The arrangement of (a), wherein at least one propeller is pivoted in unison with a wing section, while said propeller and section have from each other spaced medial axes.

(g) A vehicle with the arrangement of at least (a), wherein one of the propeller pairs is provided on a first wing means; an other of said propeller pairs is provided on a second wing means;

wherein said first and second wings means are borne in pivot-bearings and able to pivot at different rates of pivotion;

wherein both wing means are pivotable for substantial vertical flight and horizontal flight;

wherein all of said propeller pairs are working at vertical flight and howering;

while at least one of said propeller pairs is at least partially reduced in power consumption or retracted into said body or wing at substantial horizontal flight of said vehicle.

(h) An aircraft, wherein a propeller driving fluid motor is provided on a pivotable main lift wing and another propeller-driving fluid motor is provided on the rear elevator of the aircraft, and;

wherein said elevator is provided to be able to pivot and thereby to control the attitude of the aircraft by utilization of the air which is forced over the said elevator by the said propeller driven by said hydraulic fluid motor.

(i) An aircraft blade applicable also as a wing in an aircraft, wherein at least a pair of fluid pipes is provided and connected to at least one fluid motor, said at least one pair of fluid pipes formes the stability providing structure of the blade useable in principle also as a wing and wherein the body-cover is fastened relatively to said at least one pair of fluid pipes while rib-portions may be provided between said cover and said fluid pipes and may be holding relatively to each other or and may be fastened relatively to each other and may utilize overlapping rib portions to fasten rib-portions to each other or rib-portions to the cover or to said fluid pipes.

(k) A propeller-driving fluid motor associated to an aircraft, wherein bearing means and arm means are provided to swing a propeller-driving fluid motor upwards into a position relatively high relatively to the body whereon the motor is associated and likewise to swing it into a lower position for high speed flight, relatively to that portion of the aircraft, whereon it is located.

(l) An airfoil-section for the creation of a lift substantially perpendicular to the longitudinal chord of the section, when said section moves through a fluid which might be air or water, wherein two pipes are extending substantially parallely to each other and distanced from each other to carry on the outer ends of said pipes a fluid motor, wherein profile stabilizers are set to extend substantially normally to the axes of said pipes and to boarder at least partially the outer peripheries of said pipes, wherein longitudinal stabilizers are provided to extend substantially parallel to said axes of said pipes and laterally thereof, and, wherein at least one outer skin sheet is fastened around said stabilizers to form said airfoil-section, whereby said stabilizers and skin are stabilizing said pipes laterally of said axes to prevent lateral deformations of the plane, wherein said axes lay, and, whereby the pipes, skin and stabilizers form a rigid airfoil section which carries and holds said motor.

(m) A fluid-stream driven aircraft, comprising, a body having a medial imaginary plane of substantial symmetry; at least one wing extending substantially on both opposite sides of said plane; at least one pair of hydraulic fluid operated motors on portions of said aircraft; at least one pair of fluid stream creating, means driven by said motors, respectively, and arranged symmetrically on opposite sides of said medial plane; at least one hydraulic fluid flow producing means having at least one pair of separate fluid-handling chamber groups of equal volumes, at least one pair of separate outlets with each one of said chamber groups connected to one outlet of said outlets, respectively, and including means for fluid-tight separation of the chambers and outlets so that fluid from each chamber group passes through one of said outlets only; at least one pair of displacement means associated with said fluid-handling chambers, respectively; equally acting actuator means actuating and defining the displacement volumes of said chambers, respectively, and cooperating at equal times and in unison with said displacement means for maintaining equal movements of said displacement means so that fluid flows in said outlets at proportionate and equal flow rates; a pair of delivery passage means connecting each of said outlets with a different one of said motors, respectively; said actuator means permanently fixed to provide equal strokes of said displacement means; said motors containing fluid intaking spaces of equal number of chambers and equal volumes for equal number of revolutions at equal quantities of intake of flow of fluid; said motors having each at least one pair of ports; said ports of said motors of each pair of motors on opposite sides of said medial plane communicated vice-versa to said delivery passage means for revolving said motors of the respective pair of motors in opposite directions at equal rate of revolutions, whereby said stream-creating means on opposite sides of said medial plane are torque-balanced and driven at equal velocities for producing equal thrusts on both sides of said medial plane to stabilize the movement and attitude of said aircraft; wherein at least two return fluid lines are provided and extend from said motors to said body; wherein said motors are provided on said wings; wherein said delivery passage means and said return lines include pipe portions; wherein stabilizing means are provided between said pipe portions for forming a rigid structure; and, wherein said rigid structure is fastened to at least a portion of said wing.

In order to obtain the best benefit from the arrangements of the invention, it is strongly recommended to obey the following rules and equations of my mentioned co-pending applications or of others of my literatures:

$\rho$ = Density of air or fluid, for example = 0,125 Kgs$^2$/m$^4$ m = Mass of air or fluid, for example = rho·F·V1

Vo = Velocity of air or fluid in fluid stream before the propeller f.e. m/s

V1 = Velocity of fluid through propeller-circle; f.e. m/s

V2 = Velocity of fluid in fluid stream after the propeller; f.e. m/s

V2h = Velocity after propeller, if propeller revolves in stand

Vsf = Velocity after propeller, if propeller flies forward along axis $V1h = \sqrt{s/2\rho F} = \sqrt[3]{N/2\rho F} = m/s$
$V1f = (Vo + V2)/2 = m/s$
$V2h = 2V1h = \sqrt[3]{4N/\rho F} = \sqrt[3]{8N/2\rho F} = \sqrt{2H/\rho F} = m/s$
$V2f = \sqrt{Vo^2 + 2S/\rho F} = m/s$ H = Lift in stand or hovering, f.e.: Kg; = 2$\rho$FV1$^2$
I = impuls of mass of fluid
N = Power consumption in Kgm/sec
F = Area of propeller circle = D$^2$pi/4 with pi = 3.1416
D = Diameter of the propeller, for example, in meter = m
A = Area of wing. Biggest projection, usually vertical projection in m$^2$ $Nh$ = Power at hovering = $\sqrt{\left(\frac{1}{\eta}S\right)^3 / 2\rho F}$ $H$ = Lift in stand or hovering =

$\sqrt[3]{2\rho FN^2} = M\sqrt[3]{2\rho F \left(\frac{\eta N}{M}\right)^2}$

Ftl = Comparison factor for multiple propellers at equal power
M = Number of propellers $Ftl = M\sqrt[3]{\frac{\eta^2}{M^2}} = \sqrt[3]{M\eta^2}$ Lf = Lift of wing section in flight, for example: Kg.
Df = Drag of wing section in flight, for example,: Kg.
Cl = Lift coefficient of wing section
Cd = Drag coefficient of wing section.

$\eta$ = efficiency (ies)
$Lf = (\rho/2) CL\ A\ V^2 = KG$
$Df = (\rho/2) CD\ A\ V^2 = KG;$ whereat specific attention should be given thereto, that velocity V2 which is created by the propeller provides in some embodiments of the invention a velocity V over a wing section and thereby drag and lift; also attention should be provided, that according to my theories increase in number of propellers at a given power increases lift in stand. In most embodiments of the invention, the plural appearances are overlaying and are overlaid in such a way, that they bring the desired benefit. Since in this application pivotal movements of member appear, the term "pivotion" is used in this application to define a pivotal movement. The term "pivotion" is already used in the abstract and the disclosure of my U.S. Pat. No. 4,387,866 of June 14, 1983.

BRIEF DESCRIPTION OF THE DRAWING

FIG. 16 is a sectional view through a portion of a wing section, demonstrating an arrangement therein;

FIG. 17 is a cross-sectional view through FIG. 16 along the arrow: B—B;

FIG. 18 is a sectional view through a wing section with a propeller seen in a first angle of relative inclination;

FIG. 19 is a view as in FIG. 18, however with the propeller seen in a second angle of relative inclination;

FIG. 20 is a sectional view through a portion of FIG. 21 along the arrow A—A and demonstrates a wing arrangement;

FIG. 21 is a sectional view through FIG. 20 along the arrow: B—B; and;

FIG. 22 is a longitudinal vertical sectional view through a portion of a vehicle which is capable of travel in air.

DESCRIPTION OF THE PREFERRED EMBODIMENTS

Figure 1:
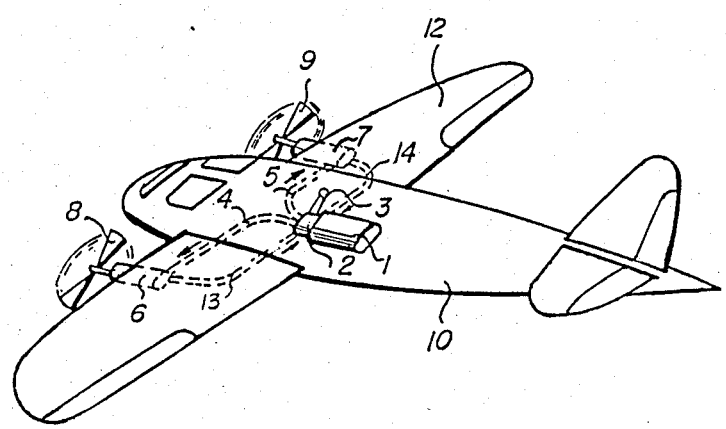
FIG. 1 is a somewhat simplified perspective view illustrating an aircraft provided with one embodiment of the invention.

Referring firstly to FIG. 1, it will be seen that the Figure illustrates an embodiment of a hydraulically controlled fluid-stream driven aircraft which is inexpensive to manufacture, handles well and easily and is very safe in operation. The aircraft has a body 10 provided with a pair of wings 11 and 12. A fluid-flow producing means is mounted on the body 10 and includes a power plant or prime mover 1, and a multiple-flow variable pump 2 of one of the types which will be described with reference to FIGS. 3-5. The rotor of the pump 2 is driven by the prime mover 1, and produces at least two separate flows or streams of hydraulic fluid. Adjusting means 3 is provided which adjusts the fluid flows in the different streams in a sense reducing or increasing the flow, but assuring that in any case the two flows are equal to one another at all times. The flows of fluid may be varied simultaneously between a zero flow rate and the maximum flow rate. Reference numerals 4 and 5 identify fluid passages which extend from the pump 2 to respective positive-displacement fluid motors 6 and 7, which drive propellers 8 and 9, respectively. The spent fluid returns from the motors 6 and 7 via respective return conduits 13 and 14 to the pump 2.

Figure 3:
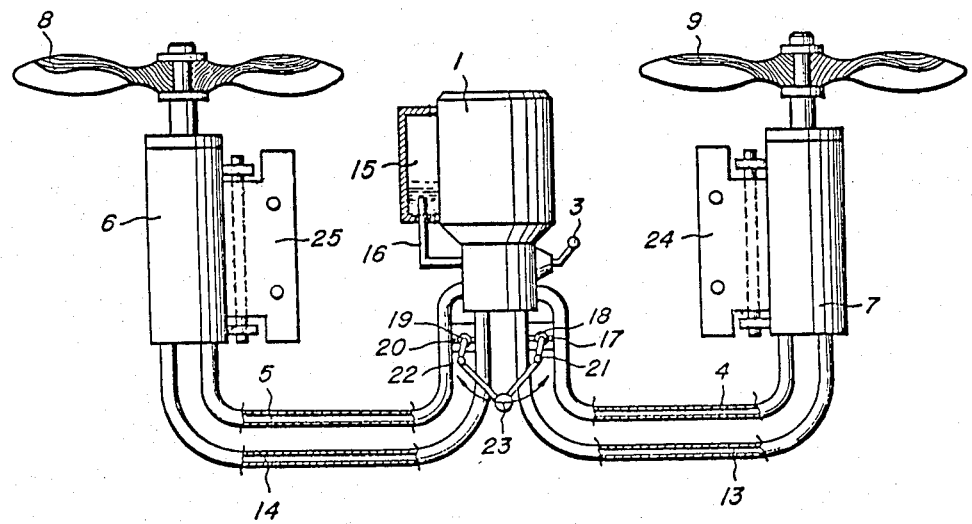
FIG. 3 is a partly sectioned view illustrating a hydrostatic power supply according to the present invention.

A hydrostatic power supply unit which can be used with advantage in the embodiment of FIG. 1, and which has in fact been diagrammatically illustrated therein, is shown in more detail in FIG. 3. It should be noted that this power unit is of a type which can be separately transported and secured to any desired craft, such as the aircraft in FIG. 1.

Like reference numerals in FIG. 3 identify the same components as in FIG. 1. Reference numeral 15 identifies a reservoir for fluid, from which the fluid flow producing means 1 receives the fluid via two lines 16 (only one shown). The fluid flow actuator means 3 acts equally in order to control the displacement volume of the displacement chambers in the fluid-flow producing means 1 (which may be of the type disclosed in FIG. 5) proportionately to each other if they change their volume. The means 3, therefore, assures that at all times at least a plurality of flows, such as a pair of flows, of equal flow rate or of proportional rate of flow travels from the fluid-flow producing means 1 separately into the fluid lines 4 and 5, to assure the proportionality of angular velocity of the propellers 8 and 9 at all times. Bypass lines 17, 18, 19, 20 may be provided between the outgoing fluid lines 4 and 5 and the respective return fluid lines 13 and 14, to enable the flow of a small fraction of fluid which flows through the delivery fluid lines 4 and 5, back into the return fluid lines 13 and 14. The bypasses may be operated separately from each other, or they may be operated in combination by an operating means 23 connected to the valves 21, 22 of the bypasses. By using the combined operating means 23, which again is to act equally and cooperate with both of the sets of in- and outgoing fluid lines, it is possible with a single operating control to change the rotary velocity of the propellers 8 and 9 relative to each other, and thus by using only a single handle to change the thrust of the fluid streams produced by the propellers 8 and 9 in any desired way.

Figure 2:
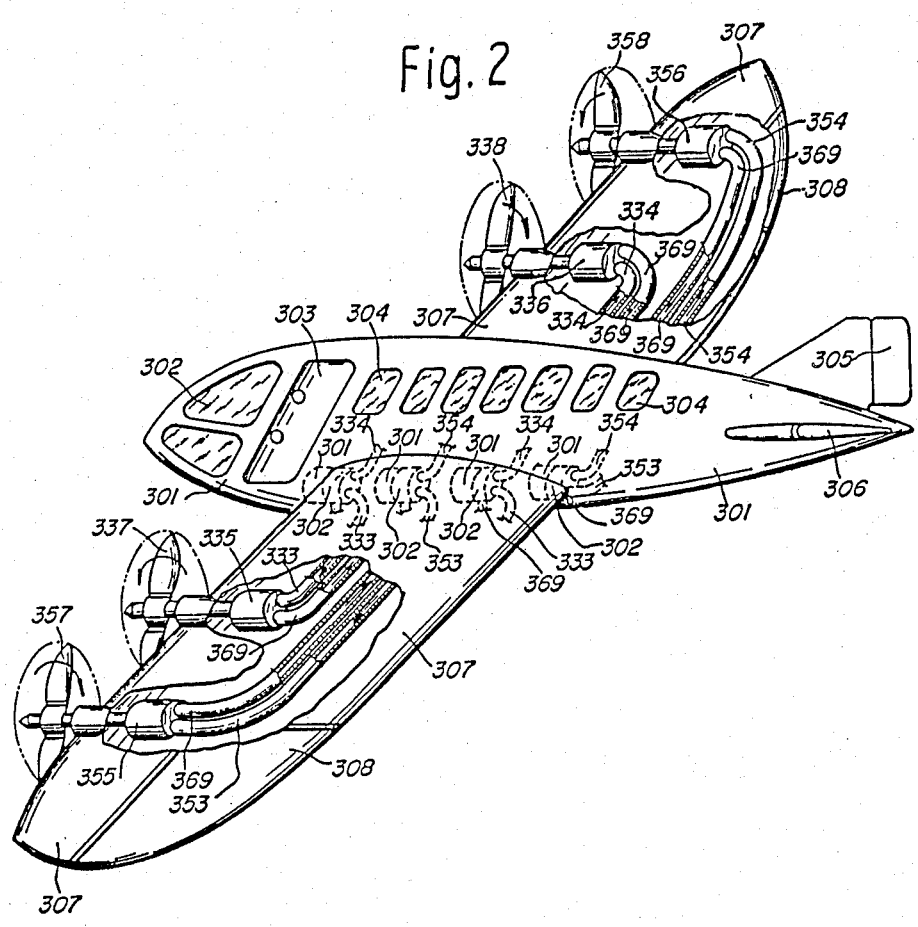
FIG. 2 is a view analogous to FIG. 1, partly broken away, but illustrating an aircraft incorporating a different embodiment of the invention.

FIG. 2 illustrates by way of example a further aircraft somewhat analogous to that of FIG. 1, but provided with a plurality of pairs of propellers, namely four propellers 336, 337, 357 and 358. Thus, for example, one set of propellers 336, 337 may be of the fixed type which cannot have the pitch of its blades changed, whereas the propellers 357 and 358 may be of the adjustable type where the pitch of the blades can be changed.

Since in FIG. 2 there are several pairs of propellers provided, the embodiment of FIG. 2 must also have several separated fluid streams of equal rate of flow. The fluid flow 333 drives the fluid motor 335 and returns via a return line 369. Fluid flow 334 drives fluid motor 338. Fluid flow 354 drives fluid motor 356. All of the fluid flows return through their respective return lines 369 directly or indirectly to the fluid flow producing means. All of the flows 333 and 334 are of equal or proportionate rate of flow. The other pair of fluid flows 353 and 354 is also separated from each other and they are also of proportionate rate of flow. A plurality of fluid-flow producing means 302 is provided, which may be driven by a plurality of power plants 301.

The relatively compact size of the fluid motors makes it possible to locate them in small spaces in the wings 307. The construction makes it possible to have the propellers 337, 336, 357, 358 rotate in opposite directions, because it is simple to reverse the direction of rotation of the fluid motor. Thus, propellers 337 and 338 may, for instance, revolve in mutually opposite directions.

The aircraft has a freight or passenger cabin 304, and an entrance 303 into the same. Cabin 302 may be provided as a pilot cabin. It should be noted that it is possible and in fact preferred to have the heavier components of the drive, such as the power plants and fluid-flow producing means, located at the bottom of the body 301 of the aircraft. Equally acting actuator means cooperate equally with all fluid-flow producing means, or rather with the displacement means in the fluid-handling chambers thereof, and this has the advantage that by means of a single control the rate of flow of fluid of all of the fluid streams can be controlled, and thereby the angular velocities of all of the propellers. Reference numerals 305 and 306 identify control rudders, and the flaps on the rings 307 are identified with reference numeral 308. Details of the construction and operation of FIGS. 1, 2, 3 and 4 are already to be found in the aforementioned copending application, the disclosure of which is incorporated herein by reference.

Figure 4:
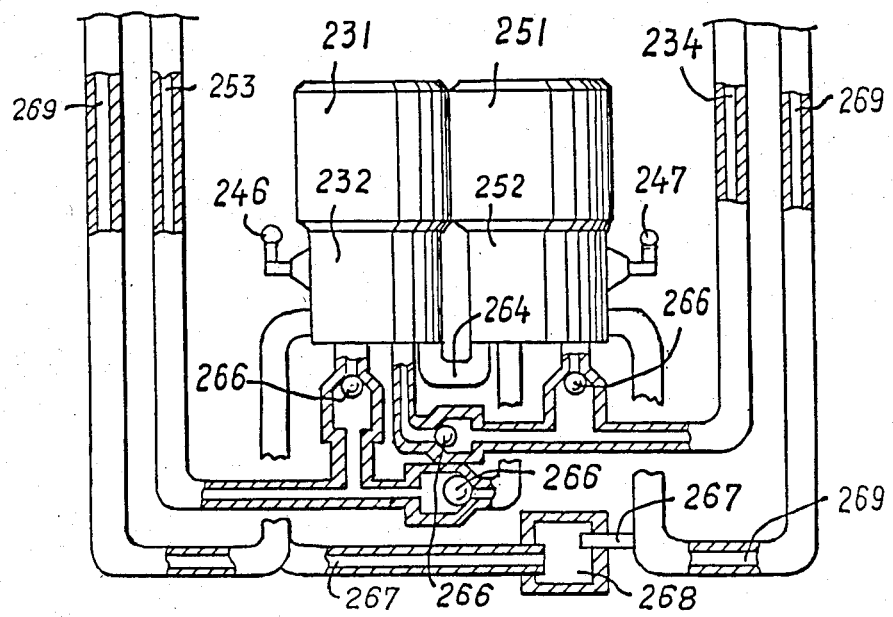
FIG. 4 is a view analogous to FIG. 3, but illustrating a further embodiment of the power supply.
Figure 13:
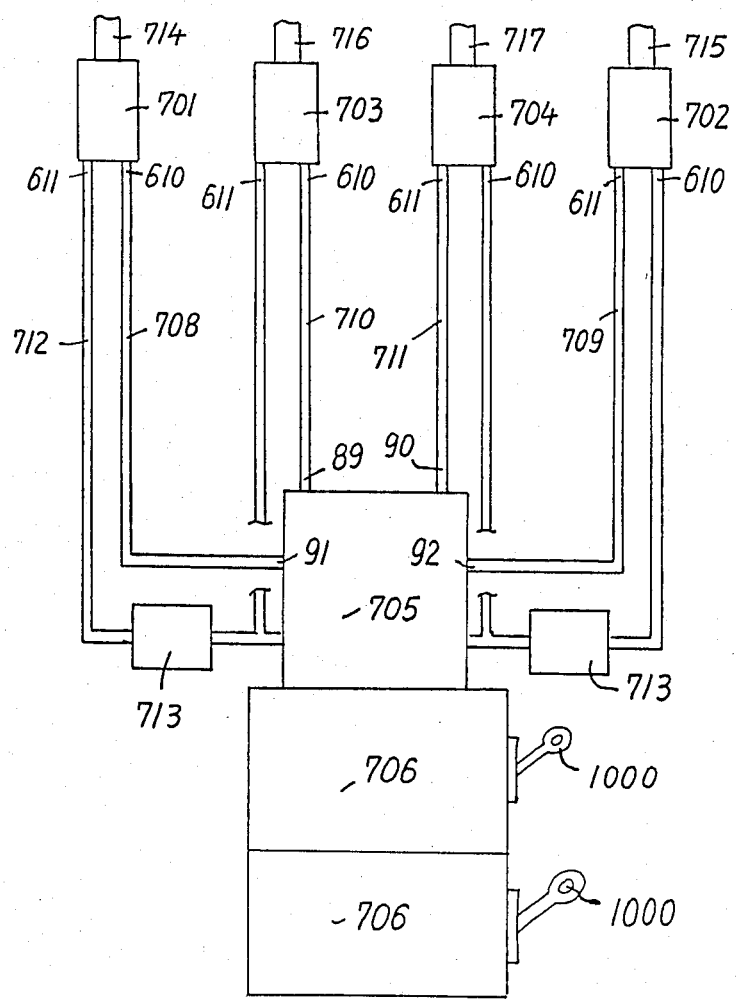
FIG. 13 shows a schematic of the connection of fluid lines.
Figure 14:
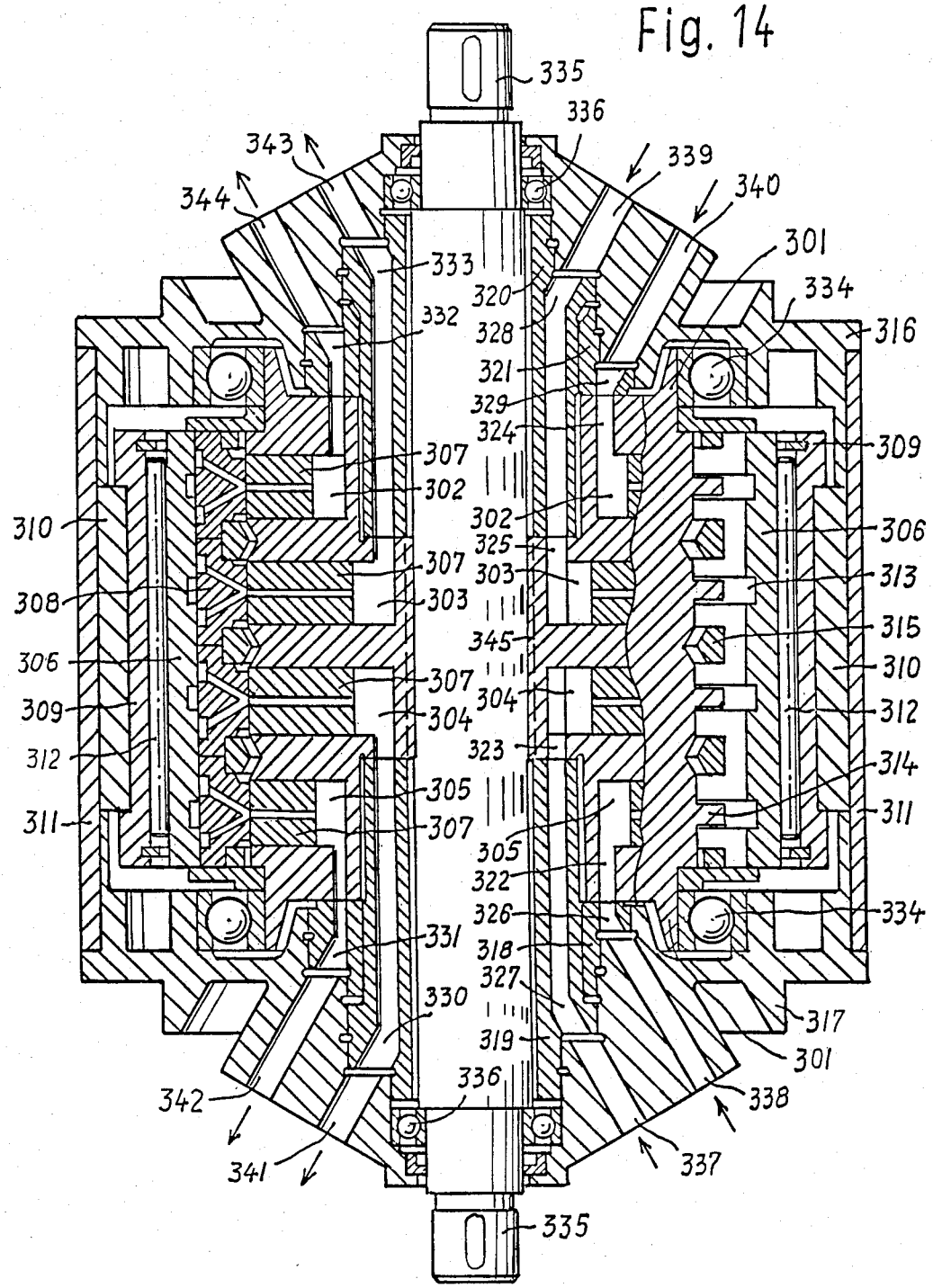
FIG. 14 is a longitudinal sectional view through a multi-flow pump.
Figure 15:
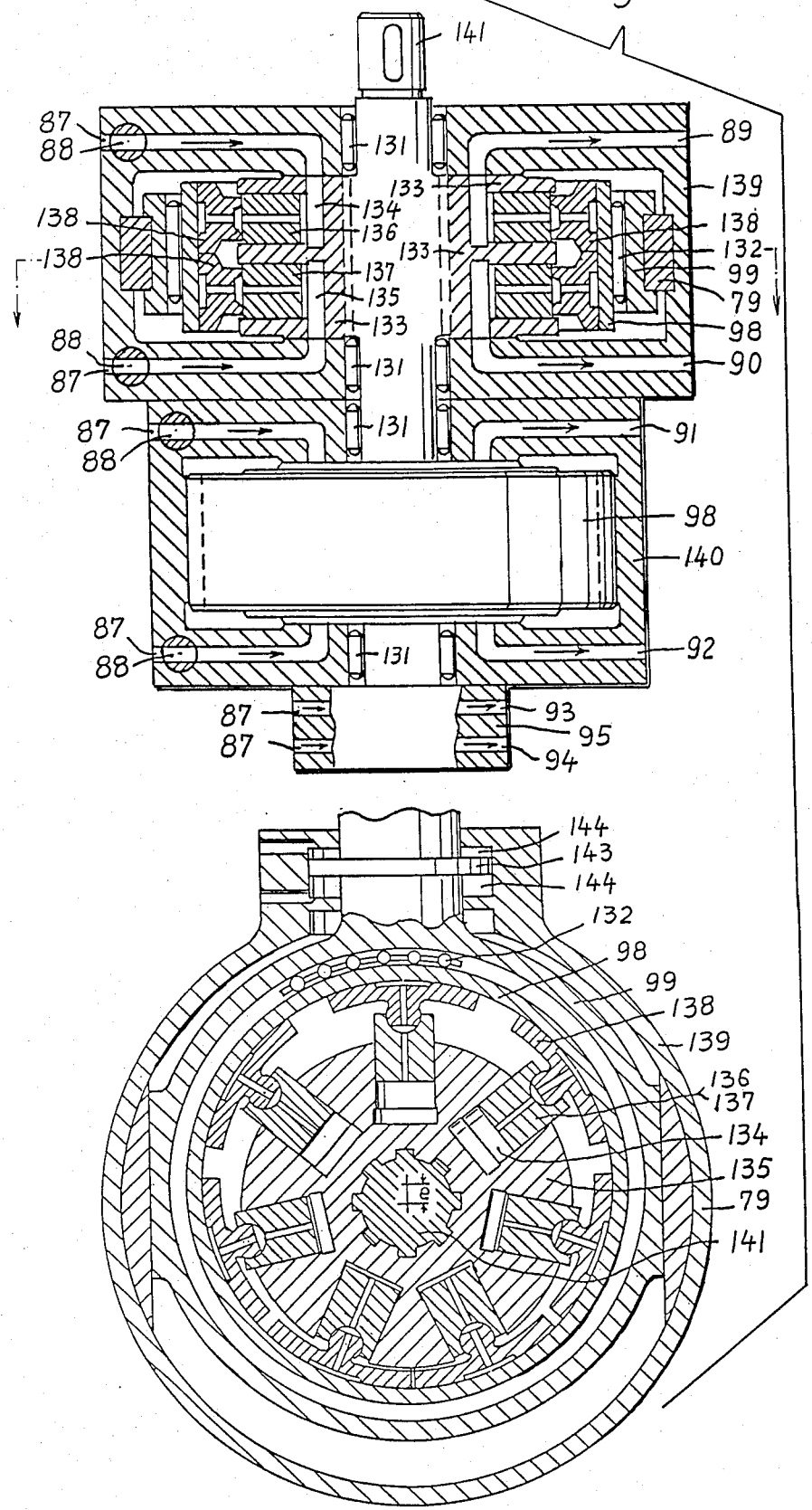
FIG. 15 is a longitudinal with a cross-sectional view through an other embodiment of a multi-flow pump of one of my inventions.

The power plants and pumps 301, 302 may be replaced in FIG. 2 by the arrangement of FIG. 13 with pump 705 of FIG. 13 being for example the pump of FIG. 14 or the pump of FIG. 15. As known in the art, the power plant 706 has a throttle for the control of the rotary angular speed and power output of the power plant. The rotary angular velocities of the motors 701 to 703 of FIG. 13; 335,338,355,357 of FIG. 2 and of the propellers 336,337,357 and 358 are then controlled by the throttle(s) of the power plant(s) 301. The power plant(s) 301 is (are) commonly (a) shaft gasturbine(s) or combustion engine(s). The throttles, f.e.: 1000, are shown in FIGS. 3, 4 and 13.

The aircraft of FIG. 2 has an inner propeller pair 336,337 and an outer propeller pair 357,358. Each propeller of a propeller pair is located diametrically opposite of the imaginary medial vertical plane of the vehicle relatively to the other propeller of the same propeller pair. The outer propeller pair has those propellers which are more distant from the medial plane. The propellers of the inner propeller pair are more close to the medial plane. The propellers of the same propeller pair have equal pitches, but they revalve in opposite directions. The propellers of another propeller pair have another pitch or angle of attack. The purpose of this arrangement is, that one propeller pair is effective at low speed, for example at take off and the other propeller pair is more effective at another speed, for example at high speed forward light.

Thus, at different forward speeds of the aircraft the respective propellers of different propeller pairs are differently loaded. They consume different powers. Due to the fluid drive of this invention however, they are synchronized. That means, that each propeller of the same propeller pair has the same, but opposite, rotary angular velocity. The different angles of attack of different propeller pairs provide the mentioned different load at equal rotary velocities of propellers but at different forward flight speeds of the aircraft. The different loading of the propeller pairs results in different consumption of power of different propeller pairs. At different powers but equal revolutions the motors of different propeller pairs thereby provide different thrusts and consume or take in different pressure in the hydraulic fluid. It is the specific feature of the fluid drive arrangement of this invention, that even at equal total power the different propeller pairs can be supplied with different power and different pressures in the hydraulic fluid without departing from the velocity synchronization of the propellers of the respective propeller pairs. Because the equalness of rate of flow provides the equal rotary velocity of the propellers even when the consumed fluid pressure of the propeller motors is different.

The hydraulic driving and control arrangement illustrated in FIG. 3 is a unit which can be mounted on any type of vehicle. This unit includes a power plant driving fluid flow producing means 1 having outputs with proportional or equal delivery rates, connected to respective supply lines 4 and 5 which deliver working hydraulic fluid to respective positive displacement fluid motors 6 and 7 at proportionate or equal flow rates. Respective return lines 14 and 13 connect motors 6 and 7 of fluid flow producing means 1, which may withdraw fluid from tank or reservoir 15 through line 16 and which is preferably provided with a fluid flow adjusting means 3 effective to control the displacement value of the displacement chambers therein in proportion to each other. Control adjustment means 3 thus assures that, at all times, hydraulic working fluid is supplied to the motors 6 and 7, driving propellers 8 and 9, at equal or proportionate rates of flow and in supply lines which are separate from each other.

Respective bypass lines 17 and 19, each including a respective control means 18 and 20, interconnect respective supply lines 4 and 5 to respective return lines 13 and 14. Bypass lines 17 and 19 have a very small cross-sectional area, compared to those of supply lines 4 and 5, and thus allow bypassing only a small portion or fraction of the working fluid. Control means 18 and 20 may be operated separately or may be conjointly operated through connection means 21 and 22 connected to a combined operating means 23. By using means or handle 23, it is possible to change the relative angular velocities of propellers 8 and 9 by operating only a single control handle.

The unit shown in FIG. 3 is transportable and may be mounted on any kind of vehicle by the adapting means 24 and 25, with the mounting on the vehicle being effected in a manner such that motors 6 and 7 are located symmetrically on opposite sides of the vehicle longitudinal axis. By virtue of a pivoting arrangement provided between each adapting member and the associated motor, the motors 6 and 7 can be swung into or out of the vehicle.

In FIG. 4, a plurality of fluid-flow producing means 232 and 252 are provided and actuated by power plants 231 and 251, respectively. They are connected with one another in that they may have a common return or interconnecting return fluid line 264. They may also have delivery fluid lines which transfer fluid out of a tank 268 into the respective fluid flow producing means 232 and 252, and the latter each produces at least a pair of separated fluid streams of proportionate rate of flow. One fluid stream moves out of the fluid-flow producing means 232 through a check valve 266 into the fluid line 233, and another fluid stream of proportionate rate of flow travels separately from the fluid-flow producing means 252 through check valve 266 which is associated with the latter, into the common fluid line 233.

Another flow of fluid flows from the fluid-flow producing means 233 at proportionate rate of flow through another check valve 266 into the fluid line 234, and still another flow of fluid which is also separated and of proportionate rate of flow, flows from the fluid-flow producing means 252 through an additional check valve 266 into the fluid line 234. In the event that during the operation one of the power plants 231 or 251 should fail, or if one of the fluid-flow producing means 232 or 252 should fail, then the other fluid-flow producing means would still continue to deliver at least one flow of fluid into each of the common fluid lines 233 and 234, respectively. The respective check valves 266 would prevent a return flow of fluid from the common fluid lines 233 and 234 back into the fluid-flow producing means which is not operating, so that a safe operation of the system would still be assured as long as only one of the fluid-flow producing means or power plants continues to operate.

The return fluid lines 269 may return the return flow of fluids directly or indirectly into the tank 268, or via cooling means into the tank 268, or else directly into the respective fluid-flow producing means 232 or 252, or into the passage 264. The passage 264, incidentally, may be a drain line if desired. The fluid lines 267 may be suction fluid lines, or fluid lines which deliver fluid into the fluid-flow producing means 232 or 252. It is apparent that instead of providing only two fluid-flow producing means 232 and 252, it would be possible to utilize more of them, and if necessary to utilize also more of the power plants 231 and 251, in which case the system illustrated in FIG. 2 could be obtained.

The fluid-flow producing means 232 and 252 are advantageously provided with fluid-flow adjusting means 246 and 247, so that the displacement volumes of the positive displacement chambers in the fluid-flow producing means, which change from minimum to maximum and vice versa during the operation of the fluid-flow producing means, will be proportionately adjusted so that the subtraction of the minimum volume from the maximum volume of the respective positive displacement chamber remains at all times proportionate to the respective volumes of others of the positive displacement chambers. The adjusting means 246 or 247 could be operated separately or in combination.

Figure 5:
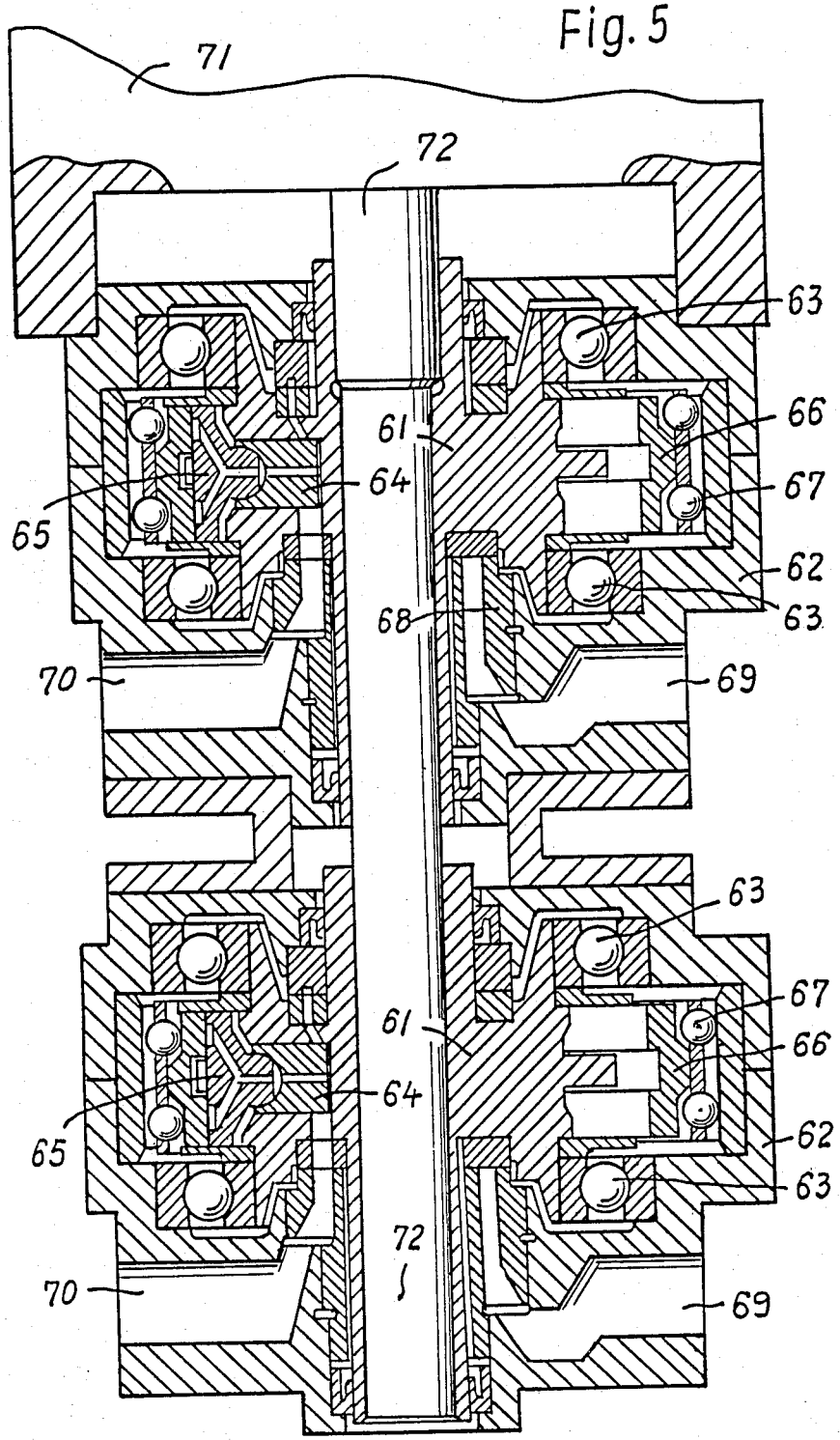
FIG. 5 is a fragmentary sectional illustration showing another embodiment of the invention.

FIG. 5 illustrates in detail how in any of the preceding embodiments equally acting actuator means may cooperate equally with the displacement means of the fluid-handling chambers of the respective fluid-flow producing means. In this Figure, reference numeral 71 identifies a power plant which drives a shaft 72 that extends through two coaxial pumps. In the pumps the rotors 61 are rotatably mounted in housings 62. Displacement means 64 serve to draw in and expel fluid with respect to the cylinders in the rotors 61. Piston shoes 65 may be associated with the displacement means 64 which are pistons, between the latter and the actuator means 66, which enforce a definite displacement or stroke of the displacement means 64 in order to actuate each fluid flow at a definite rate of flow. Antifriction bearing 63 may be provided between the rotors 61 and the housings 62, and additional antifriction bearing 67 may be provided between the actuator means 66 and the housings 62. A control member 68 may be provided to establish a fluid-tight seal between the respective rotor 61 and housing 62, and a pair of ports of which one serves for entry of fluid and one for exit of fluid is provided in each pump and communicates with the respective cylinders through passage means located in the housing and rotor and the control member, if the latter is present.

The shaft 72 drives both pumps with equal rotary velocity and may extend through both pumps, but is associated with the engine or power plant and with both of the pumps together.

The two piston stroke actuator means or actuator means 66 are so assembled, that they act equally, that is they operate equally with both pumps to assure that the rate of flow of fluid flowing out of each pump is equal to the rate of flow of fluid flowing out of the other pump. In the illustrated embodiment, the pumps are radial piston pumps, and the pistons 64 and piston shoes 65 which co-operate with the respective actuator means or piston stroke guide means 66 are so controlled by the latter that equal flow rates are assured, since in each pump the central axis of the actuator means 66 is equally spaced from the rotor-axis.

Thus, the pump of FIG. 5 is a fluid flow producing means having at least one pair of separate fluid handling chamber groups of equal volumes, at least one pair of separate outlets 70 or 69, respectively, and includes means for fluid-tight separation of the chambers and outlets so that fluid from each chamber group passes through one of said outlets only; at least one pair of displacement means 64,65 associated with the fluid handling chambers, respectively; equally acting actuator means 66 actuating and defining the displacement volumes of said chambers, respectively, and co-operating at equal times and in unison with said displacement means so that fluid flows in said outlets 70 or 69 at proportionate and equal flow rates.

Figure 12:
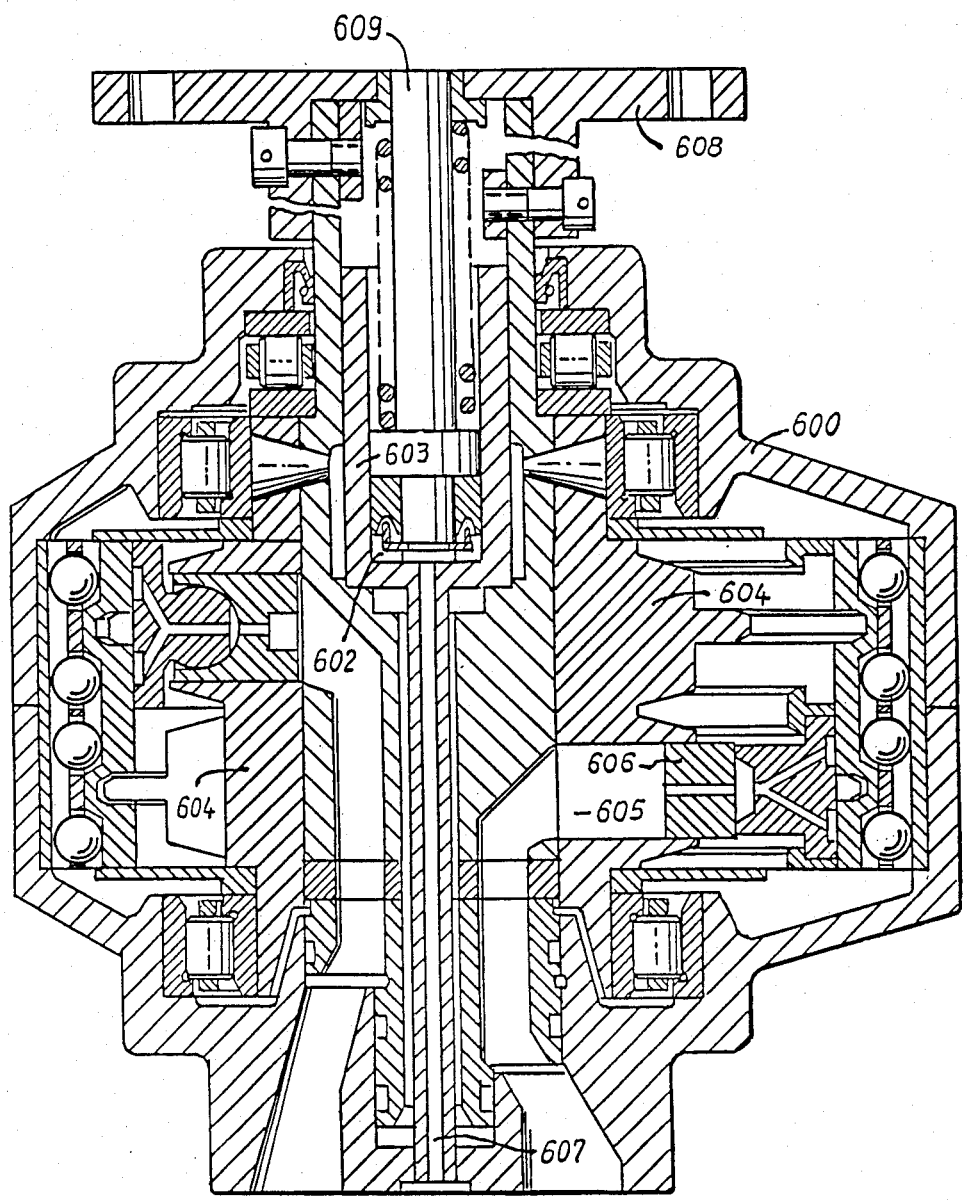
FIG. 12 is a longitudinal sectional view through an embodiment of a propeller-driving fluid motor of the invention.

One motor of FIG. 12 may for example be applied as motor 7 in FIG. 1 and another motor of FIG. 12 may also be for example applied as motor 6 in FIG. 1. A separated fluid line 5 may then be set from one of the outlets 70 or 69 of FIG. 5 to the respective entrance port of the motor of FIG. 12 which serves as motor 7 in FIG. 1. Another separated fluid line 4 may be set from the other of outlets 70 or 69 of FIG. 5 to the entrance port of the motor of FIG. 12 which acts as motor 6 in FIG. 1. Thereby the motors 6 and 7 of the vehicle of FIG. 1 are forced to revolve their shafts at equal rates of revolution preferredly in opposite rotary directions.

The pump means of FIG. 5 may also serve to drive the motors of others of the Figures. For vehicles with four motors two sets of pump assemblies of FIG. 5 may be used, or any suitable four-flow producing pump means for example that of FIG. 19 of my U.S. Pat. No. 4,171,784.

Figure 6:
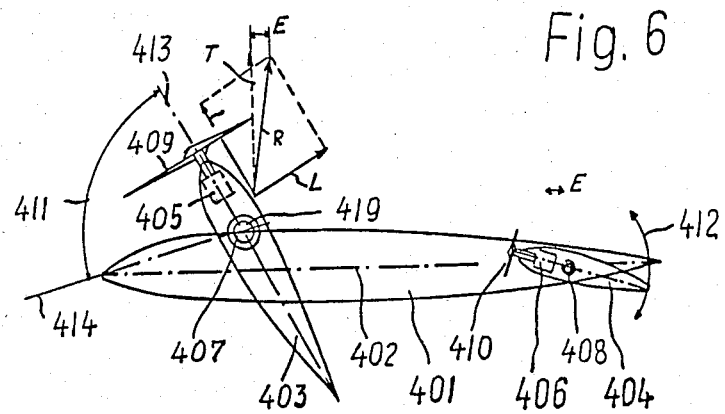
FIG. 6 is a schematic sketch of a vertical take off aircraft seen from the side having inclinable wing means and a swingable elevator-wing both with propellers borne and driven by fluid motors.

The aircraft of FIG. 6 is for vertical or horizontal flight, landing or take-off. The hydraulic motor(s) 405 of the main wing 403 drives propeller(s) 409 also in the upwards inclined position 413. The propeller(s) 409 thereby forces air with high velocity over the main wing 403. This creates a lift L on the wing 403. On the other hand the propeller 409 excerts a propeller traction S in the direction of wing axis 413. Both components of forces together apply a force R onto the body of the aircraft. This force resultant R may be seen as a vertical upward force component T and a horizontally backward component E in the specific angular and forces-play as demonstrated in FIG. 6. This would result in an upwards lift and backwards tracting of the aircraft. Since however a hydraulic propeller driving motor 406 is provided before the elevator-wing 404 the propeller 410 forces air over the elevator 404. Thereby elevator 404 can also in stand or in vertical take off, when no natural flow flows over the elevator be used for control of the horizontality of the body 401 of the craft. By swinging or pivoting the elevator wing 404 around center 408 of swing the pivoting within the angular range 412 lifts or sinks the rear portion of the body 401 of the specific aircraft of FIG. 6. By this means the aircraft can be kept in any desired inclination relatively to the surface of the earth. Without the location of hydraulic motor 406 relatively to the elevator 404 and driving by said motor or motors a propeller or propellers on the elevator or relatively located to the elevator, so, that air is forced over the elevator, the aircraft would not be stable at vertical take off, landing or flight.

In addition the propeller(s) 410 of elevator 404 provides a traction onto the elevator 404 in the forward direction and of the size E. By making traction E equal to the backward component E of R the aircraft is brought into balance of forces. It now lifts vertically up without forward or backward move. The so remaining final summation of forces on the aircraft of FIG. 6 is T and is vertically upward directed. The aircraft goes vertically up or down or hovers in air.

This is an example how for practical application a one-winged aircraft can be made to take vertically off by controlling such take off by angle 411 of the wing and by providing the propeller to the elevator and by angular control of the elevator 404.

For forward flight the main wing 403 is pivoted forward towards the position 414 to come to rest either between positions 413 and 414 or in position 414.

Figure 7:
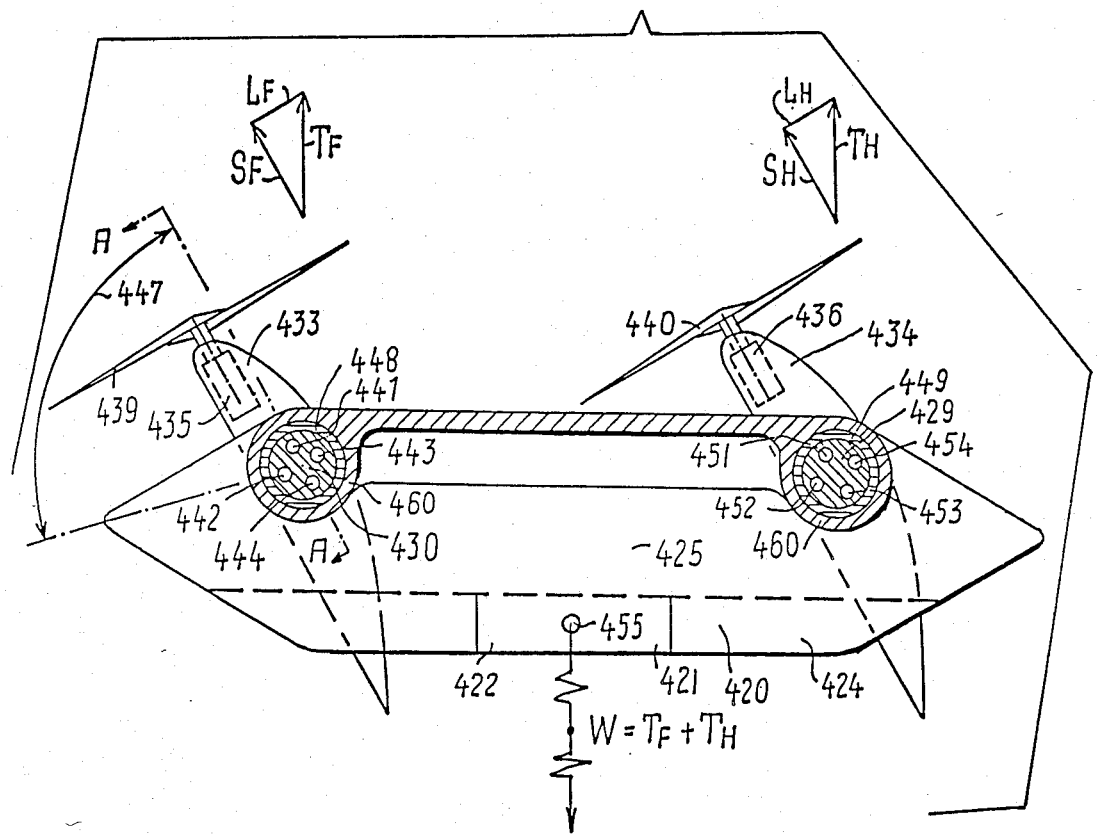
FIG. 7 shows a longitudinal sectional view through a vertical and horizontal flying or landing or take-off aircraft with swingable wings and hydraulic motors in said wings for driving propellers and whereby said longitudinal view is taken through the wings, laterally of the body of the aircraft.

In FIG. 7 a double winged aircraft is shown, having a body 420 with a heavy weight compartment 424 and a freight or passenger cabin 425. The heavy weight compartment preferrably contains the power plants, engines, pumps, 421 and 422 and other heavy material to form the weight center in the middle, but low in the body 420 of the aircraft. The body 420 is also provided with two or more wing bearings 448 and 449 wherein the main bone-structures 430,429 of the wings 433,433 can be pivoted with said wings at an angular intervall 447. The main bar or main bone of the wings may contain fluid lines 442,443,444,441, 451,452,453,454 to fluid motors 435,436 for driving the said motors and thereby the propellers 439,440 which are associated to said fluid motors. Said fluid lines communicate respective chamber-groups of respective pump means with respective fluid motors.

The propellers 439,440 force air with high velocity over the wings 433,434. The profile of said wings then provides a wing-lift L which is named LF for the front wing and LH for the rear wing. The direction of said wing lifts LF and LH is however not upwards, but upwards to the rear as shown in the component arrow diagram of the Figure when the wings have the angular pivot-position as shown in the Figure. At same time the propellers 435,440 provide a traction S in the direction of the axis of propeller and fluid motor. Front traction is cited by SF and rear traction of a propeller is cited by SH. The component of the forces diagramm shows, that these forces SF plus LF summarize to the upward directed front force TF and at the rear of the craft the forces SH and LH summarize to the upward force TH. Both forces TF and TH are upwards directed, parallel to each other and equally distanced from the center of the craft. The weight W is downward direction from center 455. Forces TF plus TH and contrary directed force W keep the aircraft in straight position. Increasing the sum TF plus TH over W brings vertical upwards movement of the aircraft. Equalizing gives hovering and decreasing of the sum TF+TH below W gives vertical sinking of the aircraft of the Figure.

For forward flight both wings 433 and 434 are downward forwardly inclined within the range of angle intervall 447 depending on the desired flight path of the craft relatively to the horizontale.

For all those aircraft which are described in this specification as vertical or horizontal flying, landing or take off aircraft it is required, that the engines, pumps and motors are of little weight but of great power. Such capabilities are not common to usual engines, pumps or motors. Suitable less weight powerful engines, pumps and fluid motors are however available by the patents of the inventor of this application. If they are used, the vertical take off and landing or otherwise horizontally flying winged aircraft becomes a comfortable reality. To use non-suitable pumps, engines, motors will however result in failure, because they may be too heavy compared to their power or too unreliable.

Figure 11:
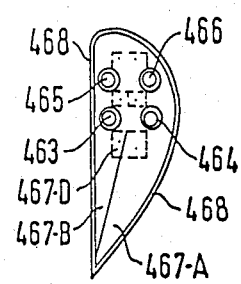
FIG. 11 is a cross-sectional view through FIG. 8 along the line XI—XI.
Figure 8:
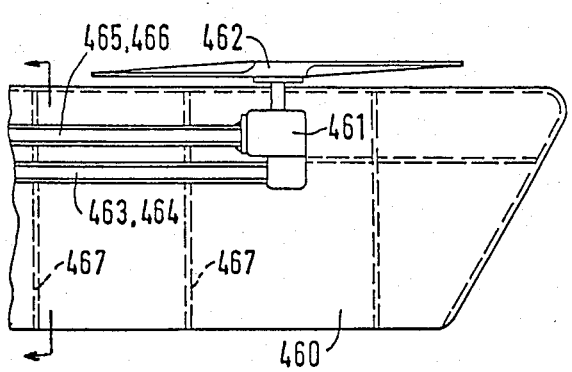
FIG. 8 is a view from above and partially sectionally through an aircraft wing or blade containing fluid lines which built or may built a part of the structure of said wing or blade and wherein said wing or blade, for example propeller blade is provided with an hydraulic or fluid motor.

In FIG. 8 and the thereto belonging sectional view, FIG. 11, a little weight wing or propeller or blade is shown, wherein the fluid lines form at least a portion of the main structure bone or bar of the said wing or blade. Two or more fluid lines, like pipes, namely 465,466,463,464 form together a holding main structure. They lead for example from a holding on the aircraft to a respective fluid motor(s) 461 for driving a thereto associated or thereby borne propeller 462. Said fluid lines can be able alone to hold and supply motor(s) 461. But in addition they may be utilized to form the wing 460 and to make the wing 460 strong and holdeable. Ribs 467 may be set around the fluid lines. In FIG. 11 they are shown as rib-portions 467-A and 467-B. Setting one of them from below and the other from up around the said fluid lines gives a strong wing-rib. They may be so configurated to keep the fluid pipes fastened between them. A medial rib-portion 467-D may be applied to rivet portions 447-A and B together to form a complete wing rib and to contain in fixed position therein two or a plurality of two or any other plurality of fluid lines or at least one fluid line. After fastening the fluid lines to the fluid motor and setting the rib portions around the fluid lines the ribs may be provided with the wing-cover 468 and said cover may be fastened to the said ribs of the wing.

The arrangement of this Figure spares the heretofore provided main bars of the wings and eliminates the weight making setting of fluid lines plus wing-structure bone-bars. The wing of these Figures is therefore, especially suitable for hydraulically operated aircraft for vertical or horizontal or combined flight.

Figure 9:
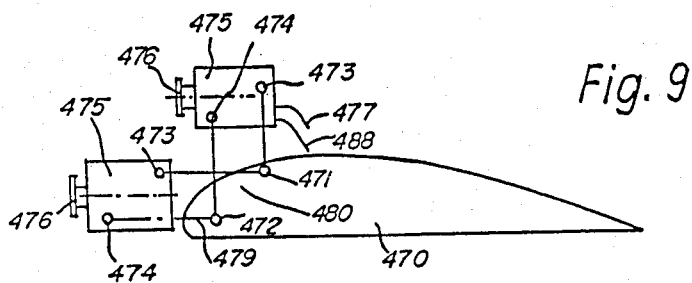
FIG. 9 is a schematic cross-sectional view through an aircraft wing whereon a swingable hydraulic propeller driving motor is mounted for swing into a position above the wing or into a position before or after the wing or into any position therebetween, if so desired.

In FIG. 9 it is shown by way of example, how a hydraulic fluid motor is associated to a wing or body. Wing 470 has holders 471 and 472 which pivotably bear or swing arms 479 and 480. These are connected by connectors 473 and 474 to propeller-driving fluid motor 475. Fluid motor 475 has a revolvable shaft 476 for holding and driving a respective propeller, the latter not shown in the Figure. For starting or landing on water or on ground the propeller motor 475 is pivoted into the above wing position, the right-up in the Figure. That prevents water coming to the propellers or the propellers coming too close to the ground. In high-speed flight the location of the propeller-axis above the wing however provides a tilting moment to the craft and the forces of resistance and of traction are not in the same plane.

Therefore, according to this Figure the fluid motor is pivoted forward or backward downward into the left-shown position for acting substantially about in the center face through the wing or body. This stabilizes the craft in the air at flight. The swing of the motor from above to before or behind the wing or vice versa is possible due to flexible fluid lines or hoses 477,478.

Thus, the aircraft wing or body of the Figure is especially convenient for low-winged aircraft, for water-aircraft, motor gliders and like.

Figure 10:
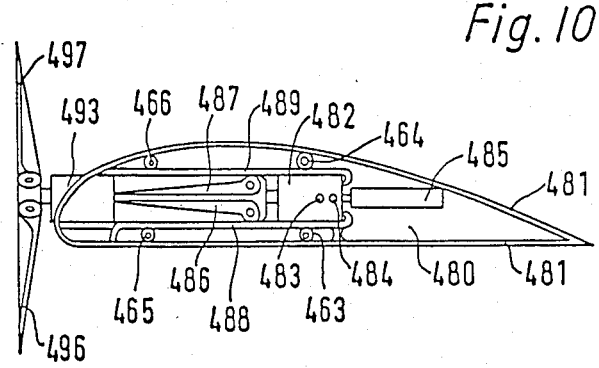
FIG. 10 is a cross-sectional view through an improved wing of an aircraft which contains a guide for a retractable propeller driving motor and wherein the propeller and motor are shown in a retracted and in an operational position.

FIG. 10 demonstrates an arrangement in an aircraft wing, which is especially attractive and useable to vertical take off aircraft or to motor gliders and like.

For vertical take off big diameter propellers or many propellers are needed. Otherwise the lifting efficiency becomes so bad, that the aircraft will not lift, if economic engines, like piston or rotary, not turbine-engines are provided.

At sailing of the glider or at high speed flight of the aircraft the propeller(s) may make too much drag to fly economical or at high speed. It is therefore desired, to tract one or more of the propeller(s) into the body or into the wing.

That is accomplished by subtracting the propeller-driving fluid motor with its associated propeller into the body or wing. And to move it out and into action again, if so desired. Wing or body 470 has guide means 488,489 for guiding or sliding the fluid motor 482. Motor 482 is once shown in the retracted position inside of the wing. It is also shown in the other position as motor 493. Operator means 485 may either tract the motor with propeller into the wing 480 or out of it into operating position. In operating position propeller arms 496 and 497 may be swung out into operating position by remote control of automatic control. In the retracted position the propeller arms 486 and 487 may be swung forward about 90 degrees to be able to form a narrow device for being retractable into the wing or even into the guide means 488,489. Fluid lines 466,465,463,464 may again, for example as in FIGS. 8,11 or 7 form the bone(s) of the wing and may hold the guide means 488,489.

The subtraction into the wing, as shown in the Figure, makes it possible to provide economically a plurality of propellers to wings and to bring them back into the wing(s) if so desired. Thus, this wing has the capability to provide an economic vertical take off aircraft for the money the average man can spend and said vertical take off aircraft will well be able to be transformed in flight to an economic high speed aircraft. For example the propeller or propeller-pair for high speed flight may be of variable pitch. The propeller or propeller-pairs for vertical take-off may be of the swing in-retractable type of FIG. 10. Flexible hoses may lead to ports 483 and/or 484 of motor 482. Closing covers may be moved over the open portion between 488 and 489 as soon as the propeller and its motor are retracted into the wing, so, that wing 480 is a fully closed wing with cover 481 when the motor and propeller are retracted into it.

In FIG. 12, which is a longitudinal sectional view through an example of a propeller-driving fluid motor, the housing 600 contains revolvingly borne therein the rotor 604 which has working chambers 605 for intaking fluid and driving pistons 606 in said chambers 605 for revolving the rotor 604 off the motor. The rotor of this embodiment of the invention is provided with a central bore or hub which extends also through the entire motor. A cylinder or thrust chamber 602 is provided in or on the motor and a member or piston 603 is moveable therein. It may be exerted from the other end by spring pressure. It is especially convenient to provide space 602 as a cylinder provided in the rotor hub and a piston 603 axially moveable therein. A fluidline 607 extends through at least a portion of rotor 604 to said space 602 to operate the member 603 therein by fluid pressure. Propeller flange 608 may be mounted to the shaft and rotor of the motor; and member 609 associated to member 603 may extend through propeller shaft 608 to control and drive the variable or swingable members or portions of the associated propeller.

FIG. 13 is a schematic, which shows, how the outlets of respective pumps and the inlets of respective motors, which drive the propellers of a respective propeller-pair are connected by respective fluid lines with each other for the transfer of fluid from the pump to the motors and thereby to transfer the power from the power plant to the rotors, to synchronize the rotary speed of the rotors of a rotor-pair and to divide the power into power portions to rotor pairs with a variable ratio of the rate of power to one of the pairs relatively to the rate of power in the power portions to the other pair, when the arrangement of FIG. 13 is used in a plural-propeller-pair driven vehicle, for example of FIG. 2, and, when the forward velocity of the vehicle varies.

Power plant assembly 706 consists of one or more power plants to drive one or more pumps means 705. Means 705 may be example be the pump of FIG. 15 or 14. When it is FIG. 14's pump, it has outlets 89 to 92 with outlet pair 89,90 and an other outlet pair 91,92.

Motors 701 and 702 form a first motor pair to drive with their shafts 714,715 a first rotor-pair of a first resistance during rotation. Motors 703,704 form a second motor pair to drive with their shafts 716,717 a second rotor pair of a second resistance during rotation of the respective rotors.

The rate of flow in the outputs 91 and 92 is equalized in the pump means and transfered by separated fluid lines 708,709 to the entrance ports 610 of the respective motors 701 and 702 to revolve the motors of this pair with equal rotary velocities.

The rate of flow in outputs 89 and 90 is also equalized in the pump means and transferred by the separated fluid lines 710 and 711 to the entrance ports 610 of the motors 703 and 704 of the other motor pair to revolve the motors of this pair also with an equal rotary velocity relatively to each other.

When the rate of flow in outputs 89,90 is equal to the rate of flow in outputs 91,92, then all motors revolve with equal rotary velocity. The different resistances of the first and second resistance then define the difference of the power portions to the first and second rotor pair. The ratio of one of the power portions to the other comes from different pressures in the fluid lines to different rotor pairs because of the different first and second resistances. The ratio of the power portion to one of the pairs relatively to the power portion to an other of the pairs will change, when the first and second resistances are changing.

Return fluid lines 712 may transfer the return fluids from exit ports 611 of the motors to a tank means 713 or directly into the pump 706 depending on operation in an open or closed hydraulic circuit, or circuits.

In the embodiment of FIG. 14 a common actuator means 306 acts on the displacement members 307 of four separated fluid flow delivery chamber groupes 302,303,304,305 to deliver four separated flows of equal rate of flow in the pressure fluid out of two pairs of exit ports or outlets 431,343 and 342,344.

Two separated fluid flows of equal rate of flow can thereby be utilized to be send to a first motor pair to drive a first pair of fluid motors and thereby to drive a first pair of rotors or of propellers of a first resistance during rotation.

To other fluid flows of equal rate of flow can thereby be utilized to be send to another pair of motors to drive a second pair of rotors or propellers of a second resistance during rotation.

More details of the Figure can be obtained from FIG. 19 and the description thereof in my U.S. Pat. No. 4,171,784.

The arrangement now provides a first fraction of power of the power plant into two first power portions of a first pressure in the fluid defined by the resistance of the rotors of the first rotor pair and it provides a second fraction of power of the power plant into two second power portions of a second fraction of power of a second pressure in fluid defined by the second resistance of the second rotor pair.

When the resistances in the first and second rotor pairs are equal, the first and second power portions are equal. When the resistances of the first and second rotor pairs are different, there exists a ratio of the first power portion to the second power portion.

When said ratio varies during operation of a device, for example in different surrounding or due to different resistances of the rotor pairs at a certain speed of the arrangement, the ratio varies automatically in response to the difference of the resistances.

The pressure in the fluid lines to the first pair is then different from that to the second pair. Thus, the arrangement provides a power division means with equal power portions in power fractions to equal pairs but different power portions in power fractions to different pairs.

The pump means of FIG. 15 has a first working portion for the creation of a first pair of flows of fluid of equal rate of flow to be transfered separatedly out of outlets 89 and 90.

It also has a second working portion 98 for the creation of a second pair of fluid flows of equal rate of flow to be separately transfered out of the separated outlets 91 and 92.

The bottom Figure is a cross-sectional view through the portion of the top-Figure along the line IX—IX and shows, that at least one of the mentioned working bodies is provided to supply a pair of variable flows of equal rate of flow. The other working body may supply a pair of fixed flows of equal rate of flow out of outlets 91 and 92. But also this working portion could be built similar to that of the other working portion and thereby be made able to supply two variable flows of equal rate of flow too.

More details, how this pump means is operating and designed can be studied in FIGS. 8 and 9 of my U.S. Pat. No. 4,171,784.

The pump means of FIG. 15 can for example, be used, to temporary revolve both propeller pairs of FIGS. 2 and/or 6 equally and to act other times to let one of the propeller pairs run slower or faster than the other and it can also be used at other times to set one rotor pair or one of the propeller pairs to rest.

When one of the mentioned pairs is set to rest all or almost all of the power of the power plant is transferred to the other pair of rotors or propellers.

The arrangement including this Figure as pump means is thereby able to divide the power into desired power portions of rates of power at will.

The latter may be done by the incorporation of respective control means 99,143 of FIG. 15, which can variate the actuator 99 to variate the strokes of displacement members 136,137 of the portion of the pump inside of housing portion 140 of FIG. 15 in the way as described by FIGS. 8 and 9 of my U.S. Pat. No. 4,171,784.

Thus, this device is able to perform even the most sophisticated or the most variant ranges of the ratios of power fractions or portions of the invention.

At discussions of the invention it has become visible, that not all persons immediately understand the invention. They are commonly assuming, that a control means should be provided to control the flow of power portions. Occasionally it is also assumed, that propellers must consume more power, when they are revolving faster.

Both assumptions may be correct for conventional technology, but they are not at all times correct for the present invention and its application, because in the invention the division of power and the variation of the power ratios occurs automatically. The only control means for the invention is the "throttle" of the power plant, which defines the speed and output of the power plant.

The gist of the invention is therefore partially also shown in the following explanation.

The gist of the invention (and main claims) is, that the variation of the rates of power to the different propeller pairs is not done by variation of the power of the power plant as a whole, but occurs automatically and depending on the forward velocity of the craft. The pilot normally does not influence this automatic power variation of the power fractions and portions going to the different propeller pairs.

To give an example of practical flight:

The pilot may have available a long runway. He is not forced to start with over power for a short runway. The pilot is conscious of the fuel consumption. His power plant may give him, for example, 100 Horsepower maximally at, for exmple, 5000 rpm. But he knows, that the best fuel consumption and best economic power rating of his engine is at 75 HP at 4000 RPM. Now, in order to save fuel, he intends to run his power plant in this most economic fuel consumption range.

The aircraft, which the pilot intends to fly, is an aircraft of the present invention. Thereby the pilot has one single means for control of power to his disposal. That is the throttle of his power plant. For example, a shaft-gasturbine with a pump thereon or a combustion-engine with the pump thereon. He has indications on his throttle (or accellerator in cars) which indicate the setting of the power rate.

This fuel conscious pilot now may act as follows:

He sets his throttle to power rating 4000 RPM, 75 HP. He leaves the throttle in this position and does not touch the throttle any more until later he will land at his destination. (Provided during the flight from departure to destination he is not disturbed by air traffic, bad whether or like.) He from thereon gives his attention only to his three rudders, side rudder, elevator(s) and aileron(s).

His craft starts to move foreward on the long runway. His Propellers with the low pitch grasp the air effectively but his propeller pair with the steeper pitches are not so effective now. They are more a burden. His craft gains forward speed. Finally, after a long run with the best power range, the craft ascends from the runway and flies. Both propeller pairs may now bite at about the same efficiency. Finally his craft is reaching the cruising speed. At this forward speed of the craft, the propellers with the steeper angle are in best condition and they bite very effectively now for the long flight towards the destination. The propellers with the lower pitch are now at about "zero" angle of attack relatively to the air. They now give the smallest resistance, since they do not grasp much air any more. They are merely running along without taking much power and without taking much air to drive the aircraft.

What has happened during the procedure is, that the craft runs first with effective power range towards the low pitch propeller pair and then gradially changes the rate of power to the propeller pair with the steeper angle of attack. The pilot did not do any power-control at all. All variations of the power rates to the different propeller pairs has happened automatically and without any action by a control means or by a pilot.

This is the major gist of the present invention, and hereon, the main claims have to be based.

The slightly more sophisticated, but possible, control at will is only an addition to the basic invention and it requires a knowledge of more sophisticated control by the pilot.

Therefore, again an example of practice:

The aircraft, which the pilot intends to use has the pump means of FIG. 15. Now again, he will set his throttle to 4000 RPM and to 75 HP. Because he is energy consumption conscious.

He knows, since he has more sophisticated education, that his propeller pair with the steeper pitch is a burden at start and it will increase his required runway length. Consequentely, he uses the members 143,144,99 to reduce the rate of flow in portions 98 of FIG. 15. His propeller pair with the steeper pitch is now revolving slower. It uses less effective power. The power ratio may even be much smaller now than the power ratio which is going to the now more effective propeller pair with the smaller angle of attack or with the duller pitch. His craft needs now a shorter runway-length and ascends earlier. He then gradually with increasing forward speed of flight, increases the rate of flow out of portion 98 of FIG. 15 by controlling members 98,99,143,144 of FIG. 15 to a greater rate of flow (longer piston stroke). At the final flight stage of cruising speed, this portion 98 of pump 15 now supplies the main portion of the power, the gretaer rate of power in the 75 HP 4000 RPM to the propeller pair with the steeper angle of attack and the steeper pitch.

There could be other practical applications too. For example, the portion with two flows, the variable portion 98, of FIG. 15 could be communicated to the propeller pair with the smaller, finer, or lower angle of attack or propeller pitch. But those things are possibilities, but not the matter of the basic main gist of the invention. When too many of such possibilities, which might be added, would be given into the specification, the main gist of the invention would become more and more in danger of being misunderstood or overlooked.

THE APPLICATION OF THE INVENTION

To use the invention beneficially in practical application in aircraft, a number of my newer discoveries should become obeyed. At a first glimpse it might look, that the provision of different propeller pitches to different propeller pairs would already bring the desired results.

In the basic application it would be true, that the application of different pitches of propellers in different propeller pairs would be within the scope of the invention. Thereby the propeller pairs might be synchronized mechanically by gear means or otherwise, for example by the hydraulic transmission as in the embodiments of the Figures. However, the basic application will not in all cases bring benefit. Because there have been a number of relationships discovered in my co-pending patent allications. Those relationships, which are expressed in the co-pending applications in mathematical formula, are of great influence to the benefit of the invention in application in practice. The mentioned relationships can rarely or never be obtained from common aircraft literature; because they obviously have never been considered before my respective inventions.

To obtain an effective aircraft with good economical operation and with an optimum of economy for certain flight speeds and distances, the mathematical rules of my co-pending applications should become considered in addition to the effects of the pitches of the propellers. For example, the differences of the speed ranges in efficiency to the propellers as well as the number of propellers and their effects on thrusts of propellers in the respective speed ranges of the disclosures of my mentioned co-pending applications and their mathematical disclosures have to be taken into consideration. Only if that is done, the final and best propeller pitches for the respective speed ranges, numbers of propellers and flight distances can be designed.

The mathematical disclosures of my earlier application Ser. No. 973,780 may now be obtained.

DETAILED DESCRIPTION OF THE PREFERRED SPECIFIC EMBODIMENTS

Referring now to FIGS. 16 and 17, it will be seen, that FIG. 16 is substantially equal to FIG. 9. However, FIG. 17 is added to demonstrate in greater detail the swing mechanism by which the fluid motor 475 is swung upwards or downwards.

This embodiment of the invention serves especially to overcome a hazardous difficulty of common aircraft. The aircraft presently still need high fuselages or landing gears, because the big diameters of the propellers or of the jet engines require a certain minimum of distance of the axes of the propellers or jet engines from the ground. The bodies and wings of the aircraft are thereby rather high in the air and that is uncomfortable and cause instability at starting and landing. The high landing gears also provide excessive weight and expense.

A similar difficulty exists when aircraft are waterborne craft, which start and land on water. Then it is often so, that the body of the craft acts as a boat floating on water. (Since the propellers would then, if usually as in other aircraft provided, run with their tips into the water.) Consequently, the engines and propellers of such waterborne aircraft are often situated high above the wings or bodies, mounted on specific holding structures. While that takes care for the starting and landing on water, it is less suitable for flight in air. Because now the axes of the propeller(s) are (is) offset from the medial axis of resistance of the body at flight through air.

The embodiment of FIGS. 16 and 17 of the invention will effectively overcome the mentioned difficulties and inconveniences as well as ineffectivenesses of the typical propeller-driven aircraft of today. It therefore provides a fluid motor 475 on a portion of a body, for example on the body of an aircraft or on a wing 470 of an aircraft with a capability to be set into at least two different locations. The first location is the upswung location, where the fluid motor is swung into the higher position. The axes of the fluid motor and of the propeller 9 are now higher than the medial plane through the body or wing 470. In this position, when the propeller 9 with fluid motor 475 is fixed into the first, the upper location, the craft can start or land on water, snow, ice or ground, with respective short bottom portions. High landing gears are spared.

At later flight through the air, the fluid motor 475 with propeller 9 will be swung into the second location, which is the swung down location.

In the swung down location, the axes of the fluid motor 475 and of the propeller 9 are substantially equal to the medial plane through the body 470 or through the wing section 470. Any other suitable location between the two mentioned locations may be set, if so desired.

The embodiment makes thereby possible a starting and landing on ground or water with short landing gears or even on simple wheels. The high structures of present day aircraft can be spared by the arrangement of the invention. At the same time however, the embodiment permits a highly economic forward flight in air without increasing the drag of the aircraft significantly over the drag of equally strong aircraft of today.

In detail, the body or wing 470 may have holders 679 to bear therein swing bars or pivot bars 471,472. Holding arms 479,480 are pivotably borne on the mentioned bars 471 or 472 respectively and on their other ends they are engaging swing portions 473,474 respectively to hold them and thereby to hold the fluid motor 475, whereto the holding portions 473,474 are fastened. Fluid motor 475 may be set and be held, for example, between for example four arms 479,480, two on each lateral side, as seein also in FIG. 17.

To swing the fluid motor 475 with it's propeller 9 from the first into the second location or vice versa, an actuator may be provided. In the Figures the actuator is a fluid cylinder 670 with ports 677,678 to chambers in the cylinder. A piston 672 is axially movable in the cylinder and extends therefrom to be connected by connecter 673 to the actuator arm 674. In FIG. 16 the arrangement shows the actuator in the position of location of the second location of the fluid motor and propeller. The dotted lines show the assumed position of location of actuator arm 674 in position 675, when the fluid motor and propeller are swung by the outwards moving piston 672 into the first location of fluid motor and propeller above the wing or body 470. Cylinder 670 may be borne in holder 671. The ports 67 and 678 of cylinder 670 are respectively connected over fluid lines and control means to a fluid power source in order to swing the fluid motor and propeller from the first into the second location and vice versa at the required time of operation of the aircraft or vehicle. The fluid lines 477, 478 to and from the fluid motor 475 are either led though the holding arms or pivot arms or swing arms 479, 480 and through the respective bars or holders or portions 473,474; or they are provided as flexible hoses. The driving fluid to operate the motor 475 and thereby to revolve the propeller 9 is given by supplying pressure fluid through at least one of the fluid lines 477 or 488. So, as it is done in principle also in the other embodiments of the invention.

In the embodiment of FIGS. 18 and 19, the specifity of the invention is, that the propeller 439 is pivotably borne on an airfoil section, for example on a wing 433. Axis 2000 of propeller 439 is pivotable from axis 694 to axis 693 and vice versa. To operate the pivotion of the axis of the propeller and thereby of the propeller, a bearing holder 471 is provided and bearing housing 480 bears pivotably thereon. Housing 480 holds or contains fluid motor 435. Fluid motor 435 carries and drives the propeller 439. The pivot arm portion 690 extends from bearing 480 and is connected by connecter 673 to piston 672. Piston 672 is movable in cylinder 670, while cylinder 670 is swingably borne in holder 671. In FIG. 19 the arrangement is shown in the second axis-location 694, while in FIG. 18 the arrangement is shown in the first axis-location 693 of the propeller and motor axis. Instead of making the angle variable between locations of axes 693 or 694 it is also possible to fix an axis direction therebetween. At present time however, I prefer the variable axis direction of this embodiment. Because the best overall direction of the axis of the motor and propeller is still under investigation.

In these embodiments of the invention, the effects of the mathematical considerations are taking hold. The propellers are tracting and providing a lift or thrust as shown and defined in the respective equaitions for "Hh" and "Hf". As a side effect the velocity of the propeller stream "V2" appears behind the propeller. The invention now makes good use of the propeller-stream velocity "V2", namely "Vsh" or "V2f" in order to provide an artificial airflow or airstream over the wing section 433. The direction of the propeller axis relatively to the medial plane 3000 of the chord of the section is very important. It greatly influences the desired lift of the wing section, but also induces drag on it.

By the equations, which are given, all effects can be calculated, when the "Cl"-"Cd" values of the section are known. The arrows "T" are showing the thrust of the propeller 439; "L" shows the vertical lift of the wing section under the propeller flow, "R" shows the component of lift vertically to the medial chord plane of the section; "B" and "W" show resistances, namely drags of the wing section 433 under the influence of the propeller stream; "F" shows the remaining forward thrust or traction of the propeller and "N" the remaining thrust or traction of the propeller in the respective axis direction in FIG. 19. It should be understood, that, when calculating, the difference between propeller in stand and in flight must be considered, because it brings the very different results of air flow speeds V2, namely the differences between "V2h" and "V2f" which greatly influence the outcome of the arrangement. In addition the forward movement, if any is taking place, through the air is to be added to the calculation of the forces appearing on the wing section 433. The point-dotted lines 3000 in the Figures are demonstrating in schematic the medial planes of the chords of the sections or wings, in order to be able to see the loacation of the propeller axis or axes relatively to the mentioned medial plane 3000. Because this relation is important for judging the influence and effects of the embodiments of the invention.

Presently it is convenient to apply the arrangement of the variable angles of axes of propellers and motors of FIGS. 18 and 19 to the embodiment of FIG. 7. Because it provides the best possibility to obtain an optimum of lift and of efficiency in the inter-thrust range between vertical take off and horizontal flight, when the propellers are pivoting from vertical axes to horizontal axes. At a later time however, a best overall angle of installment of inclination of the propeller axis relatively to the medial plane or chord 3000 may become established by empirical results. Such best angle of inclination of overall operation may then be set instead of the variable arrangement of FIGS. 18,19 in order to save the weight and costs of the application of the variable inclination-axes arrangement.

A great difficulty in the building of aircraft and of wing sections can be overcome by the embodiment of FIGS. 20 and 21. Wings are requiring usually many parts and many fasteners. They are thereby becoming heavy and very expensive. In order to overcome the heavy weight and to reduce the great costs, this embodiment of the invention is provided. It utilizes two fluid lines 5 and 14, whereof one is an entrance or delivery fluid line and the other is a return fluid line. The fluid lines are provided by pipes 5555 and 1414 respectively. Their axes may be parallel to each other or slightly inclined to each other. However, the axes of the pipes 5555 and 1414 are located in a pipe axes plane.

which in this embodiment may coincide with the medial chord plane 3000. The outer ends "E" of the fluid line pipes 5555,1414 are fastened to entrance and exit ports "PE" and "PO" of a fluid motor 461 respectively. Thereby the fluid motor 461 is borne and held by the fluid pipes 5555,131414. The shaft of motor 461 holds and carries the propeller 462. When fluid flows through the pipes it also flows through the motor and revolves thereby the shaft of the motor and the propeller 462. So far the arrangement is basically known from my earlier patent 3,211,399. Novel however is, that the housing of the motor 461 directly connects to the pipes and that the pipes are connecting under a ninety degree or other degree angle of the shaft and propeller.

The decisive novelty of the embodiment however is, that the only two pipes are carrying and holding the wings in combination with holding the motor, the propeller and driving the propeller. This feature saves weight. because the wing is now constructed of only a very few parts. In order to be able to hold and carry the wing, and in order to prevent deformation normal to the axes plane 3000, it is required and provided by the present embodiment of the invention, to insert longitudinal stabilizers 1554,1555 substantially normal to the chord of the profile or wing section. To form and hold the profile of the airfoil section, also sectional stabilizing portions or stabilizers 1467 and/or 1468 may be provided and be fastened.

A profile skin 468 may then be set over the entire arrangement.

Important in this embodiment is also the ease and perfection, with which the arrangement is actually built and obtained.

The longitudinal stabilizers 1554,1555 may extend through the length of the wing. They may be divided or be one piece sheets from top to bottom of the wing skin 468. The profile stabilizers 1467,1468 are however preferred to be build of upper portions 1468 and bottom portions 1467. The end adjacent to the skin 46 may be fastened to it. At the inner ends however, they are formed by ends which embrace the neighboring portions of the pipes 5555,1414 or at least meet portions of them. Thereby the pipes 5555,1414 are fixed between the ends of the upper and bottom portions of profile stabilizers 1467 and 1468. The bottom portion 468 of the skin may be fastened first to the stabilizers 1554, 1555 by bent portions or fasteners 1515 and also to the stabilizers 1467. Thereafter the upper portion of the skin 468 may be bent backwards over the profile stabilizers 1468 and fastened to them as well as to the longitudinal stabilizers 1554,1555, until the ends of the skin 468 are meeting and form the rear edge of the wing section. By fastening the rear ends of the skin 468 together to form the rear edge of the profile and of the wing section, the assembly is perfect and form-stable. The arrangement of this type of wing is very strong and inexpensive. It is easy and fast at building. It is of low weight and fulfills many purposes at the same time. Namely the provision of the wing, the driving and holding of the fluid motor and the revolving of the propeller. The inner ends "I" of the pipes are fastened preferably to the body of the craft and to the pump or fluid supply means.

The embodiment demonstrated in part in FIG. 22 is an alternative to the vertical take off and landing, but horizontally flying aircraft of FIG. 7. Instead of pivoting two motor carrying wings as in FIG. 7, the embodiment of FIG. 22 carries to each lateral side symmetrically a pivotable medial wing 635 with medial plane 3000, which pivots in unison with two therefrom distanced pivotally borne motor holders 829,929. A control means 1445 with handle or connecter 1446 assures by connections to pivot arms 1444 over connecters 1447 the pivotion of wing holder 729 in unison with propeller holders 829 and 629. The pivot means are consisting of housings 630,730,830, wherein the holders 829,729,629 are pivotably borne respectively. Pivot arms 1444 are extended from holders 829,729,629 though windows 631 in the bearing housings 830,730,630. The holders may be first pipes 829, 729, and 629. Inner or second pipes 929 may be provided in the holder pipes 829,729,629. The holders may be pivotable around the center lines "O". One of the pipes may in each holding assembly be a fluid line to transfer fluid to a fluid motor 435,436 respectively, while the other pipe of the holding assembly may be a return fluid line. For example, pipe 929 in pipe 829 may carry a driving fluid to port 666 of fluid motor 435, while pipe 829 returns the fluid from exit port 667 of fluid motor 435. Fluid line 929 in pipe 629 carries driving fluid to entrance port 666 of motor 436 and pipe 629 returns the fluid from exit port of motor 436. By such arrangement only the outer pipes, namely the holder pipes and their pivotion is visible to the outside. The interior pipes 929 are invisible to the viewer. The effect of revolving the two propellers and the medial wing therebetween in unison is, that a smooth change over from vertical take off or landing to horizontal flght is possible. The medial wing is away from the propellers at least temporarily and temporarily independend thereof. The craft of this embodiment is inexpensive and it is strong. However, it requires bigger diameters of the outer pipes 829,729,629, than the embodiment FIG. 7. The embodiment of the FIG. 22 is thereby slightly heavier than that of FIG. 7. However, it may be for higher speed forward flight, because it has only half the number of wing portions.

The embodiment of FIGS. 7,16 and 17, may also be defined, as follows:

On a body, in combination; a streamlined sectional configuration of said body, 470, a fluid motor 475 associated to said body to carry and to revolve by fluid, which flows from a fluid supply source through said motor, a propeller 9 which is fastened to the rotor 999, 476, of said motor 475, wherein said motor is connected to said body by a structure, 479,480, wherein said structure includes means to swing said motor 475 upwards and downwards relatively to said body 470, and, wherein fluid line portions 477,488 are provided between the ports of said motor and said supply means, which permit the flow of fluid to and from different locations of said ports of said motor; and, or;

wherein said fluid motor and said propeller are swung vertically up and down along a body portion in order to temporary let said propeller 9 work effectively in air in flight and to let said propeller by swung up at other times in order to prevent a meeting of said propeller 9 with water, snow, ice or ground, when said body rides or rests on water, snow, ice or ground; and, or;

wherein said structure includes pivot arms 479,480 with inner and outer ends, wherein said body 470 is provided with pivot bars 471,472 to bear pivotably thereon said inner ends of said arms, wherein pivot portions 473,474 are provided on said motor 475 to bear pivotably thereon said outer ends of said arms, wherein said arms are provided parallely relatively to each other, wherein said arms have equal lengths and equal distances of the centers of said inner ends and outer ends from each other, and, wherein an actuator means 670,672 is provided to pivot said arms around said pivot bars of said body, whereby said motor and said propeller are pivoted from an upper location to a lower location relatively to said body; and, or;

wherein said body 470 is a portion of an aircraft, wherein said actuator is a fluid cylinder 670 with a therein reciprocating piston 672, wherein said cylinder 670 is connected to said body 470, f.e. by 671 and said piston is connected at least indirectly to at least one of said arms, f.e. over 673,674,471 wherein a control means is provided to said cylinder to actuate and control the movement of said piston and thereby the said pivotion of said motor and propeller from said upper location to said lower location and vice versa, and, wheren said pivotion is exercised under maintenance of the direction of the axes 2000 of said motor and of said propeller, whereby said axes are parallel to their different locations at other times.

It will be understood that each of the elements described above, or two or more together, may also find a useful application in other types of constructions differing from the type described above.

While the invention has been illustrated and described as embodied in a fluid-stream driven aircraft, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims.

What is claimed, is:

1. On an airfoiled wing, in combination, a streamlined sectional configuration of said wing with a longitudinal span and a relatively thereto normal chord, a fluid motor associated to said wing to carry and to revolve by fluid which flows from a fluid supply source through a rotor of said motor a propeller which is fastened to said rotor, wherein said motor is connected to said wing by a structure, wherein said structure includes means to swing said motor upwards and downwards in normal direction relative to said span and parallel to said chord of said wing, wherein said structure is provided with means to keep the axes of said rotor and propeller at all times substantially parallel to said chord, and, wherein fluid line portions which include rigid pipes and moveable fluid line portions are provided in said structure and between the ports of said motor and said supply source to permit the flow of fluid to and from different locations of said ports of said motor.

2. The wing of claim 1, wherein said fluid motor and said propeller are swung vertically down relative to said wing in order to temporarily let said propeller work effectively in air in flight of said wing and said motor and propeller are swung vertically up relative to said wing temporarily at other times when said wing is close to the surface of the earth.

3. The wing of claim 1, wherein said structure includes pivot arms with inner and outer ends, wherein said wing is provided with pivot bars to bear pivotably thereon said inner ends of said arms, wherein pivot portions are provided on said motor to bear pivotably thereon said outer ends of said arms, wherein said arms are provided parallely relatively to each other, wherein said arms have equal lengths and equal distances of the centers of said inner ends and outer ends from each other, and, wherein an actuator means is provided to pivot said arms around said pivot bars of said wing, whereby said motor and said propeller are pivoted from an upper location to a lower location relatively to said wing.

4. The wing of claim 1, wherein said wing is a portion of an aircraft, wherein said actuator is a fluid cylinder with a therein reciprocating piston, wherein said cylinder is connected to said wing and said piston is connected at least indirectly to at least one of said arms, wherein a control means is provided to said cylinder to actuate and control the movement of said piston and thereby the said pivoting of said motor and propeller from said upper location to said lower location and vice versa, and, wheren said pivoting is exercised under maintenance of the direction of the axes of said motor and of said propeller, whereby said axes are parallel to their different locations at other times.

5. In an aircraft, in combination, a body which carries a power supply means which includes a pump to supply a flow of fluid and a wing with a laterally from said body extending span and a substantially parallel to said body extending chord;

wherein a fluid line pipe structure is fastened to said body and to portions of said wing to carry and hold said wing and to hold and stabilize the streamlined airfoild configuration of said wing;

wherein a vertically pivotable pipe structure is fastened to said fluid line pipe structure to hold on said pivotable structure a fluid motor which includes a revolvable rotor while a propeller is fastened to said rotor;

wherein variable means are provided between said fluid pipe structure and said pivotable structure to permit pivoting of said pivotable structure on said fluid pipe structure under maintenance of a sealed communication between a respective pipe of the fluid line structure and a respective pipe of said pivotable structure;

wherein fluid is supplied from said pump through said fluid pipe structure and through said pivotable structure to said motor to drive the revolution of said rotor and said propeller on said rotor; and;
wherein drive means are provided to swing said motor with said propeller in unison with said pivotable structure from a position above the front portion of said wing to a position before said wing and vice versa, whereby said motor and said propeller are swingable into a higher and a lower position with said lower position before the chord of said wing, and,
whereby said propeller creates and maintaines a flow of air at all times over a portion of said wing regardless whether the propeller is in its higher or lower position and in any position therebetween and said flow of air increaes the speed of flow of air at least over the upper portion of said wing to a higher speed than the speed with which the wing moves forward relatively to the ground to increase the lift of said wing by said flow of air.

* * * * *